United States Patent
Wang et al.

(10) Patent No.: US 12,058,648 B2
(45) Date of Patent: Aug. 6, 2024

(54) COMMUNICATION METHOD AND DEVICE

(71) Applicant: HUAWEI TECHNOLOGIES CO., LTD., Guangdong (CN)

(72) Inventors: Jun Wang, Shanghai (CN); Wenjie Peng, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 337 days.

(21) Appl. No.: 17/487,729

(22) Filed: Sep. 28, 2021

(65) Prior Publication Data
US 2022/0022168 A1    Jan. 20, 2022

Related U.S. Application Data

(63) Continuation of application No. PCT/CN2020/081882, filed on Mar. 27, 2020.

(30) Foreign Application Priority Data

Mar. 28, 2019 (CN) .......................... 201910245325.9

(51) Int. Cl.
*H04W 72/02* (2009.01)
*H04W 72/04* (2023.01)
(Continued)

(52) U.S. Cl.
CPC ....... *H04W 72/02* (2013.01); *H04W 72/1263* (2013.01); *H04W 72/20* (2023.01);
(Continued)

(58) Field of Classification Search
CPC ......... H04W 4/44; H04W 4/46; H04W 72/02; H04W 72/1263; H04W 72/20;
(Continued)

(56) References Cited

U.S. PATENT DOCUMENTS

2016/0143078 A1* 5/2016 Jeong ................ H04W 28/0278
                                                             370/329
2018/0279275 A1* 9/2018 Chen ..................... H04W 72/23
(Continued)

FOREIGN PATENT DOCUMENTS

CN          107079530 A     8/2017
CN          109286979 A     1/2019
(Continued)

OTHER PUBLICATIONS

Office Action issued in Indian Application No. 202117046568 on Mar. 24, 2022, 7 pages.
(Continued)

*Primary Examiner* — Awet Haile
(74) *Attorney, Agent, or Firm* — Fish & Richardson P.C.

(57) ABSTRACT

The present disclosure discloses example communication methods, apparatuses, and mediums. One example method includes selecting a target side identifier corresponding to a communication type by a media access control (MAC) entity of a first terminal device, where the communication type includes unicast communication, multicast communication, or broadcast communication, and the target side identifier includes a destination layer 2 identifier or a destination layer 1 identifier. A first sidelink logical channel (LCH) is obtained by the MAC entity of the first terminal device, where the first sidelink LCH is an LCH having a highest priority among LCHs that correspond to the target side identifier and the communication type and that have data. A transmission resource to data on the first sidelink LCH is allocated by the MAC entity of the first terminal device.

20 Claims, 15 Drawing Sheets

(51) Int. Cl.
   *H04W 72/10*     (2009.01)
   *H04W 72/12*     (2023.01)
   *H04W 72/1263*   (2023.01)
   *H04W 72/20*     (2023.01)
   *H04W 72/52*     (2023.01)
   *H04W 72/56*     (2023.01)
   *H04W 80/02*     (2009.01)

(52) U.S. Cl.
   CPC ........... *H04W 72/52* (2023.01); *H04W 72/56* (2023.01); *H04W 80/02* (2013.01)

(58) Field of Classification Search
   CPC ..... H04W 72/52; H04W 72/56; H04W 76/11; H04W 76/14; H04W 80/02; H04L 5/0044; H04L 5/0053; H04L 5/0064; H04L 5/009
   See application file for complete search history.

(56) References Cited

U.S. PATENT DOCUMENTS

| | | | |
|---|---|---|---|
| 2018/0368167 | A1  | 12/2018 | Kim et al. |
| 2019/0053251 | A1* | 2/2019  | Loehr ............... H04W 72/1263 |
| 2021/0266804 | A1* | 8/2021  | Lee ................ H04W 36/06 |
| 2021/0274540 | A1* | 9/2021  | Lee ................ H04W 72/23 |
| 2022/0086685 | A1* | 3/2022  | Kang ................ H04W 76/27 |
| 2022/0124678 | A1* | 4/2022  | Lee ................ H04W 72/23 |

FOREIGN PATENT DOCUMENTS

| | | |
|---|---|---|
| EP | 3206452 A1    | 8/2017  |
| IN | 201817009424 A | 6/2018  |
| KR | 20090123937 A | 12/2009 |
| WO | 2019022477 A1 | 1/2019  |

OTHER PUBLICATIONS

3GPP TS 36.321 V15.4.0 (Dec. 2018), "3rd Generation Partnership Project; Technical Specification Group Radio Access Network; Evolved Universal Terrestrial Radio Access (E-UTRA); Medium Access Control (MAC) protocol specification (Release 15)," Dec. 2018, 131 pages.

Fraunhofer HHI et al., "NR V2X support for Unicast and Groupcast Communication," 3GPP TSG RAN WG2 Meeting #104, R2-1816772, Spokane, USA, Nov. 12-16, 2018, 4 pages.

Huawei, HiSilicon, "Consideration on miscellaneous MAC aspects for NR SL design," 3GPP TSG-RAN WG2 Meeting #105, R2-1902039, Athens, Greece, Feb. 25-Mar. 1, 2019, 4 pages.

Huawei, HiSilicon, "Discussion about sidelink LCP procedure," 3GPP TSG-RAN WG2 Meeting #105, R2-1902040, Athens, Greece, Feb. 25-Mar. 1, 2019, 4 pages.

MediaTek Inc., "Remaining issues of SL LCP," 3GPP TSG-RAN WG2 Meeting #108 R2-1914654, Reno, USA, Nov. 18-22, 2019, 5 pages.

Office Action issued in Chinese Application No. 201910245325.9 on Jun. 28, 2021, 15 pages (with English translation).

OPPO, "Discussion on UP aspects of unicast and group-cast for NR-V2X," 3GPP TSG-RAN WG2 Meeting #104 R2-1816340, Spokane, USA, Nov. 12-16, 2018, 4 pages.

PCT International Search Report and Written Opinion issued in International Application No. PCT/CN2020/081882 on May 29, 2020, 18 pages (with English translation).

ZTE, "Discussion on LCP procedure for PC5 CA," 3GPP TSG-RAN WG2 Meeting #101bis R2-1804509, Sanya, China, Apr. 16-20, 2018, 5 pages.

Extended European Search Report issued in European Application No. 20777503.2 on May 24, 2022, 12 pages.

Huawei, HiSilicon, "SL LCP change for eV2X," 3GPP TSG-RAN WG2 Meeting #102, R2-1808317, Busan, Korea, May 21-25, 2018, 3 pages.

* cited by examiner

COMMUNICATION METHOD AND DEVICE

CROSS-REFERENCE TO RELATED APPLICATIONS

This application is a continuation of International Application No. PCT/CN2020/081882, filed on Mar. 27, 2020, which claims priority to Chinese Patent Application No. 201910245325.9, filed on Mar. 28, 2019. The disclosures of the aforementioned applications are hereby incorporated by reference in their entireties.

TECHNICAL FIELD

This application relates to the wireless communication field, and in particular, to a communication method and device.

BACKGROUND

Vehicle-to-everything (V2X) is considered as one of the fields with the most industry potential and the most clear market demand in an internet of things system, and is characterized by wide application space, great industry potential, and strong social benefits. V2X is of great significance to promote innovation and development of vehicle and information communication industries, build new models and new business forms of vehicle and transportation services, promote technological innovation and application of autonomous driving, and improve transportation efficiency and a safety level. V2X refers to using vehicle-mounted sensors and vehicle-mounted terminals to provide vehicle information and using various communication technologies to implement vehicle-to-vehicle communication, vehicle-to-pedestrian communication, vehicle-to-infrastructure communication, and vehicle-to-network communication.

In a long term evolution (LTE) system, V2X supports only broadcast communication. In a new radio (NR) system, however, V2X supports not only broadcast communication, but also unicast communication and multicast communication. Currently, for the NR system, a V2X communication method is required to enable a receive end device to receive data of a corresponding communication type, to reduce a packet receiving error rate of the receive end device, and further improve packet receiving efficiency of the receive end device.

SUMMARY

Embodiments of this application provide a communication method and device, so that a receive end device can receive data of a corresponding communication type, to reduce a packet receiving error rate of the receive end device, and further improve packet receiving efficiency of the receive end device.

To achieve the foregoing objective, the following technical solutions are used in the embodiments of this application.

According to a first aspect, an embodiment of this application provides a communication method. The method includes: A first terminal device sends sidelink control information SCI and traffic data to a second terminal device, where the SCI includes a second target side identifier and a communication type, or includes the communication type. According to this solution, the second terminal device can receive the traffic data of the corresponding communication type, to reduce a packet receiving error rate of the second terminal device, and further improve packet receiving efficiency of the second terminal device.

In a possible implementation, the first terminal device determines the traffic data based on the second target side identifier and the communication type, where the second target side identifier is used to identify the traffic data. According to this solution, the first terminal device can determine, based on the second target side identifier and the communication type, the to-be-sent traffic data, and send, to the second terminal device, the SCI corresponding to the traffic data, so that the second terminal device receives the traffic data of the corresponding communication type, to reduce the packet receiving error rate of the second terminal device, and further improve the packet receiving efficiency of the second terminal device.

In a possible implementation, the first terminal device receives first configuration information sent by a network device; or the first terminal device stores first configuration information, where the first configuration information includes the second target side identifier, the communication type, and second configuration information corresponding to the second target side identifier and the communication type, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type and second configuration information corresponding to the communication type, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the second target side identifier, the communication type, second configuration information corresponding to the second target side identifier and the communication type, information about quality of service, and configuration information of a sidelink radio bearer corresponding to the information about the quality of service, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type, second configuration information corresponding to the communication type, information about quality of service, and configuration information of a sidelink radio bearer corresponding to the information about the quality of service, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes information about quality of service and configuration information of a sidelink radio bearer corresponding to the information about the quality of service. According to this solution, the first terminal device can obtain the synchronization configuration, the sending manner, or the position of the transmission resource based on the second configuration information, and the first terminal device can further configure the sidelink radio bearer based on the configuration information that is of the sidelink radio bearer and that is sent by the network device.

In a possible implementation, the first configuration information is a system information block, radio resource control signaling, media access control signaling, downlink control information, non-access stratum signaling, or an interface message. According to this solution, the first terminal device can send the first configuration information by using the system information block, radio resource control signaling, media access control signaling, downlink control information, non-access stratum signaling, or V3 interface message.

In a possible implementation, the first terminal device sends traffic information to the network device, where the traffic information includes the communication type. According to this solution, the first terminal device can obtain, by sending the traffic information to the network device, a transmission resource used to send the traffic data.

In a possible implementation, the first terminal device sends a buffer status report to the network device, where the buffer status report includes the second target side identifier and the communication type, or the communication type, and the second target side identifier is used to identify the traffic data. According to this solution, the first terminal device can obtain, by sending the BSR to the network device, a transmission resource used to send the traffic data.

In a possible implementation, the first terminal device sends assistance information to the network device, where the assistance information includes traffic model information and the communication type. According to this solution, the first terminal device can obtain, by sending the assistance information to the network device, a transmission resource used to send the traffic data.

In a possible implementation, the first terminal device sends the information about the quality of service to the network device, where the information about the quality of service includes the second target side identifier and the communication type, or includes the communication type. According to this solution, the first terminal device can obtain the configuration information of the sidelink radio bearer by sending the information about the quality of service to the network device.

In a possible implementation, the first terminal device receives the configuration information that is of the sidelink radio bearer and that is sent by the network device, where the configuration information of the sidelink radio bearer includes a sidelink radio bearer configuration corresponding to the second target side identifier and/or the communication type, and the sidelink radio bearer configuration includes at least one of a mapping relationship from a quality of service flow to a sidelink data radio bearer SL-DRB, a packet data convergence protocol PDCP configuration, a radio link control RLC configuration, and a logical channel LCH configuration. According to this solution, the first terminal device can configure the sidelink radio bearer based on the configuration information that is of the sidelink radio bearer and that is sent by the network device.

In a possible implementation, the first terminal device sends the configuration information of the sidelink radio bearer to the second terminal device. According to this solution, the second terminal device can obtain the sidelink radio bearer configuration based on the configuration information that is of the sidelink radio bearer and that is sent by the first terminal device, and process the received traffic data based on the sidelink radio bearer configuration.

In a possible implementation, if the first terminal device does not set up, to the second terminal device, a first connection corresponding to the second target side identifier and/or the communication type, the first terminal device sets up the first connection, where the first connection is an access stratum AS connection and/or a sidelink radio bearer connection. According to this solution, after the first terminal device sets up the first connection to the second terminal device, the second terminal device can receive the traffic data of the corresponding communication type, to reduce the packet receiving error rate of the second terminal device, and further improve the packet receiving efficiency of the second terminal device.

According to a second aspect, an embodiment of this application provides a communication method. The method includes: A second terminal device receives sidelink control information and traffic data from a first terminal device, where the sidelink control information includes a first target side identifier and a communication type, or includes the communication type. According to this solution, the second terminal device can receive the traffic data of the corresponding communication type, to reduce a packet receiving error rate of the second terminal device, and further improve packet receiving efficiency of the second terminal device.

In a possible implementation, the second terminal device determines, based on the communication type included in the sidelink control information and a capability of the second terminal device for supporting the communication type, to receive the traffic data; or the second terminal device determines, based on the first target side identifier and the communication type that are included in the sidelink control information and a capability of the second terminal device for supporting the first target side identifier and the communication type, to receive the traffic data. According to this solution, the second terminal device can receive the traffic data of the corresponding communication type based on the communication type included in the sidelink control information and the capability of the second terminal device for supporting the communication type; or the second terminal device can receive the traffic data of the corresponding communication type based on the first target side identifier and the communication type that are included in the sidelink control information and the capability of the second terminal device for supporting the first target side identifier and the communication type, to reduce the packet receiving error rate of the second terminal device, and further improve the packet receiving efficiency of the second terminal device.

In a possible implementation, the second terminal device receives first configuration information from a network device, where the first configuration information includes a second target side identifier, the communication type, and second configuration information corresponding to the second target side identifier and the communication type, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type and second configuration information corresponding to the communication type, where a second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes a second target side identifier, the communication type, second configuration information corresponding to the second target side identifier and the communication type, information about quality of service, and configuration information of a sidelink radio bearer corresponding to the information about the quality of service, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type, second configuration information corresponding to the communication type, information about quality of service, and configuration information of a sidelink radio bearer corresponding to the information about the quality of service, where a second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes information about quality of service and configuration information of a sidelink radio bearer corresponding to the information about the quality of service. According to this solution, the second terminal device can obtain the synchronization configuration, the sending manner, or the position of the transmission resource based on the second configuration information sent by the network device, and the second terminal device can further obtain a sidelink radio bearer configuration based on the configuration information that is of the sidelink radio bearer and that is sent by the network device.

In a possible implementation, the first configuration information is a system information block, radio resource control signaling, media access control signaling, downlink control information, non-access stratum signaling, or a V3 interface message. According to this solution, the second terminal device can obtain the first configuration information by using the system information block, radio resource control signaling, media access control signaling, downlink control information, non-access stratum signaling, or V3 interface message.

In a possible implementation, the second terminal device receives the configuration information of the sidelink radio bearer from the first terminal device, where the configuration information of the sidelink radio bearer includes a sidelink radio bearer configuration corresponding to the second target side identifier and/or the communication type, and the sidelink radio bearer configuration includes at least one of a mapping relationship from a quality of service flow to a sidelink data radio bearer, a packet data convergence protocol configuration, a radio link control configuration, and a logical channel configuration. According to this solution, the second terminal device can obtain the sidelink radio bearer configuration based on the configuration information that is of the sidelink radio bearer and that is sent by the first terminal device, and process the received traffic data based on the sidelink radio bearer configuration.

In a possible implementation, if the second terminal device does not set up a first connection corresponding to the second target side identifier and/or the communication type to the first terminal device, the second terminal device sets up the first connection, where the second target side identifier is used to identify that the first connection of the traffic data is an access stratum AS connection and/or a sidelink radio bearer connection. According to this solution, after setting up the first connection to the first terminal device, the second terminal device can receive the traffic data of the corresponding communication type, to reduce the packet receiving error rate of the second terminal device, and further improve the packet receiving efficiency of the second terminal device.

According to a third aspect, this application provides a communication method. The method includes: A network device sends first configuration information to a first terminal device and/or a second terminal device, where the first configuration information includes a second target side identifier, a communication type, and second configuration information corresponding to the second target side identifier and the communication type, where the second target side identifier is used to identify traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes a communication type and second configuration information corresponding to the communication type, where a second target side identifier is used to identify traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes a second target side identifier, a communication type, second configuration information corresponding to the second target side identifier and the communication type, information about quality of service, and configuration information of a sidelink radio bearer corresponding to the information about the quality of service, where the second target side identifier is used to identify traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes a communication type, second configuration information corresponding to the communication type, information about quality of service, and configuration information of a sidelink radio bearer corresponding to the information about the quality of service, where a second target side identifier is used to identify traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes information about quality of service and configuration information of a sidelink radio bearer corresponding to the information about the quality of service. According to this solution, the first terminal device and/or the second terminal device can obtain the synchronization configuration, the sending manner, or the position of the transmission resource based on the second configuration information sent by the network device, and the first terminal device and/or the second terminal device can further obtain a sidelink radio bearer configuration based on the configuration information that is of the sidelink radio bearer and that is sent by the network device.

In a possible implementation, the first configuration information is a system information block, radio resource control signaling, media access control signaling, downlink control information, non-access stratum signaling, or a V3 interface message. According to this solution, the network device can send the first configuration information to the first terminal device and/or the second terminal device by using the system information block, radio resource control signaling, media access control signaling, downlink control information, non-access stratum signaling, or V3 interface message.

In a possible implementation, the network device receives traffic information from the first terminal device, where the traffic information includes the communication type. According to this solution, the network device can allocate a transmission resource to the first terminal device based on the traffic information sent by the first terminal device.

In a possible implementation, the network device receives a buffer status report from the first terminal device, where the buffer status report includes the second target side identifier and the communication type, or the communication type. According to this solution, the network device can allocate a transmission resource to the first terminal device based on the BSR sent by the first terminal device.

In a possible implementation, the network device receives assistance information sent by the first terminal device, where the assistance information includes a traffic model and the communication type. According to this solution, the network device can allocate a transmission resource to the first terminal device based on the assistance information sent by the first terminal device.

In a possible implementation, the network device receives the information about the quality of service from the first terminal device, where the information about the quality of service includes the second target side identifier and the communication type, or includes the communication type. According to this solution, the network device can obtain the communication type of the traffic data based on the information about the quality of service sent by the first terminal device.

In a possible implementation, the network device sends the configuration information of the sidelink radio bearer to the first terminal device based on the information about the quality of service, where the configuration information of the sidelink radio bearer includes a sidelink radio bearer configuration corresponding to the second target side identifier and/or the communication type, and the sidelink radio bearer configuration includes at least one of a mapping relationship from a quality of service flow to a sidelink data radio bearer SL-DRB, a packet data convergence protocol PDCP configuration, a radio link control RLC configuration, and a logical channel LCH configuration. According to this solution, the network device can send the configuration information of the sidelink radio bearer to the first terminal device based on the information about the quality of service sent by the first terminal device.

According to a fourth aspect, an embodiment of this application provides a first terminal device. The first terminal device has a function of implementing the method according to the first aspect. The function may be implemented by hardware, or may be implemented by hardware executing corresponding software. The hardware or the software includes one or more modules corresponding to the foregoing function.

According to a fifth aspect, an embodiment of this application provides a second terminal device. The second terminal device has a function of implementing the method according to the second aspect. The function may be implemented by hardware, or may be implemented by hardware executing corresponding software. The hardware or the software includes one or more modules corresponding to the foregoing function.

According to a sixth aspect, an embodiment of this application provides a network device. The network device has a function of implementing the method according to the third aspect. The function may be implemented by hardware, or may be implemented by hardware executing corresponding software. The hardware or the software includes one or more modules corresponding to the foregoing function.

According to a seventh aspect, this application provides a communication apparatus. The communication apparatus may include at least one processor, and related program instructions are executed in the at least one processor, to implement a function of the first terminal device in the method according to any one of the first aspect and the designs of the first aspect. Optionally, the communication apparatus may further include at least one memory, and the memory stores the related program instructions. The communication apparatus may be the first terminal device in the method according to any one of the first aspect and the designs of the first aspect.

According to an eighth aspect, this application provides a communication apparatus. The communication apparatus may include at least one processor, and related program instructions are executed in the at least one processor, to implement a function of the second terminal device in the method according to any one of the second aspect and the designs of the second aspect. Optionally, the communication apparatus may further include at least one memory, and the memory stores the related program instructions. The communication apparatus may be the second terminal device in the method according to any one of the second aspect and the designs of the second aspect.

According to a ninth aspect, this application provides a communication apparatus. The communication apparatus may include at least one processor, and related program instructions are executed in the at least one processor, to implement a function of the network device in the method according to any one of the third aspect and the designs of the third aspect. Optionally, the communication apparatus may further include at least one memory, and the memory stores the related program instructions. The communication apparatus may be the network device in the method according to any one of the third aspect and the designs of the third aspect.

According to a tenth aspect, this application provides a system chip. The system chip may be used in a communication apparatus. The system chip includes at least one processor, and related program instructions are executed in the at least one processor, to implement a function of the first terminal device in the method according to any one of the first aspect and the designs of the first aspect; or implement a function of the second terminal device in the method according to any one of the second aspect and the designs of the second aspect; or implement a function of the network device in the method according to any one of the third aspect and the designs of the third aspect. Optionally, the system chip may further include at least one memory, and the memory stores the related program instructions.

According to an eleventh aspect, this application provides a computer storage medium. The computer storage medium may be used in a communication apparatus. The computer-readable storage medium stores program instructions. When the related program instructions are run, a function of the first terminal device in the method according to any one of the first aspect and the designs of the first aspect is implemented; or a function of the second terminal device in the method according to any one of the second aspect and the designs of the second aspect is implemented; or a function of the network device in the method according to any one of the third aspect and the designs of the third aspect is implemented.

According to a twelfth aspect, this application provides a computer program product. The computer program product includes program instructions. When the related program instructions are executed, a function of the first terminal device in the method according to any one of the first aspect and the designs of the first aspect is implemented; or a function of the second terminal device in the method according to any one of the second aspect and the designs of the second aspect is implemented; or a function of the network device in the method according to any one of the third aspect and the designs of the third aspect is implemented.

According to a thirteenth aspect, this application provides a communication system. The system may include any one or more of the following: the first terminal device according to the fourth aspect, the second terminal device according to the fifth aspect, the network device according to the sixth aspect, the communication apparatus according to the seventh aspect, the eighth aspect, or the ninth aspect, the system chip according to the tenth aspect, the computer storage medium according to the eleventh aspect, or the computer program product according to the twelfth aspect.

It may be understood that any apparatus, system chip, computer storage medium, computer program product, or communication system provided above is configured to implement the corresponding method provided above. Therefore, for beneficial effects that can be achieved by the apparatus, system chip, computer storage medium, computer program product, or communication system, refer to the beneficial effects of the corresponding method. Details are not described herein again.

BRIEF DESCRIPTION OF DRAWINGS

FIG. 3$b$ is a schematic diagram of multicast communication according to an embodiment of this application;

FIG. 3$c$ is a schematic diagram of broadcast communication according to an embodiment of this application;

DESCRIPTION OF EMBODIMENTS

Figure 1A:
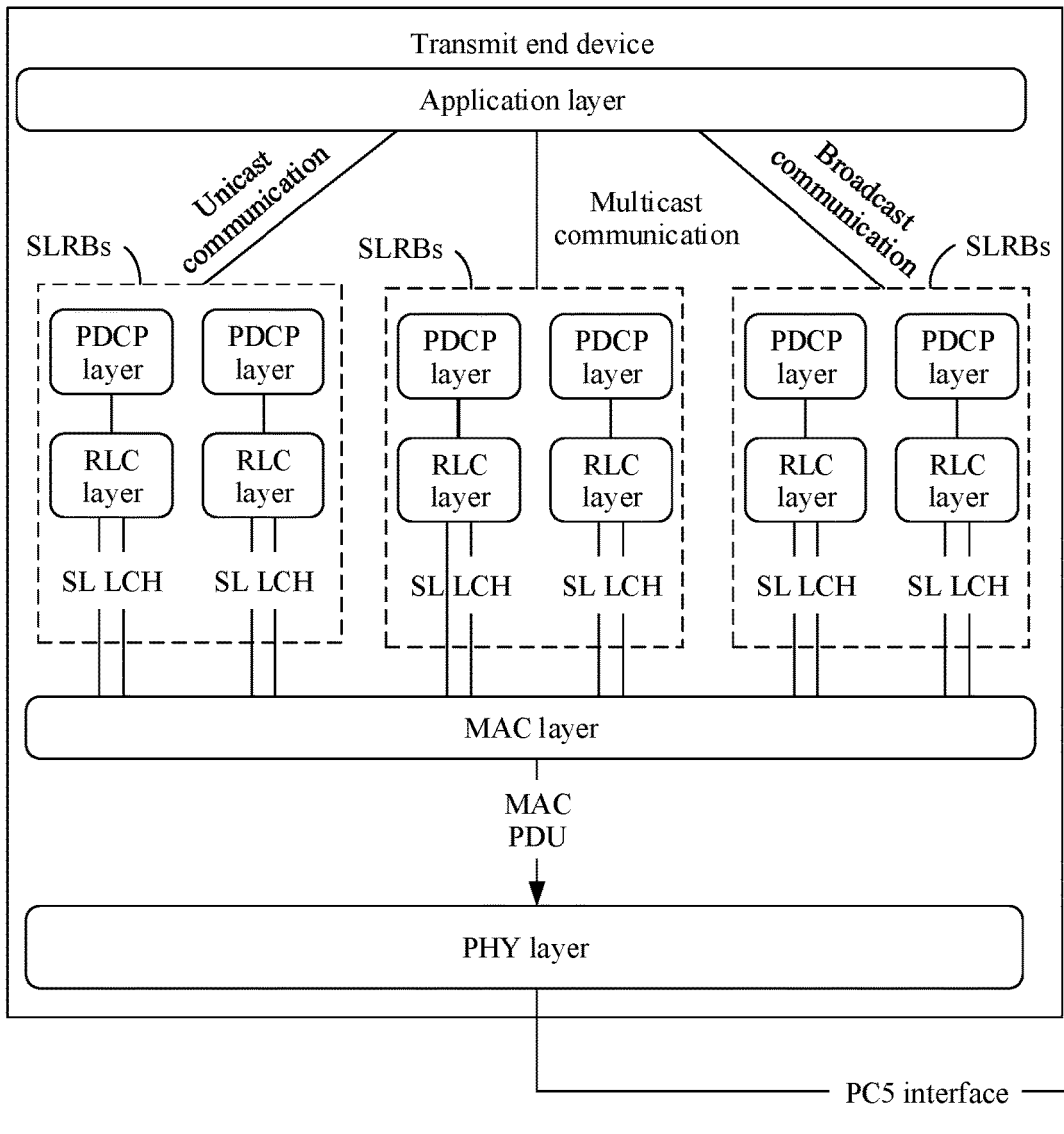
FIG. 1A and FIG. 1B are a principle block diagram according to an embodiment of this application.
Figure 1B:
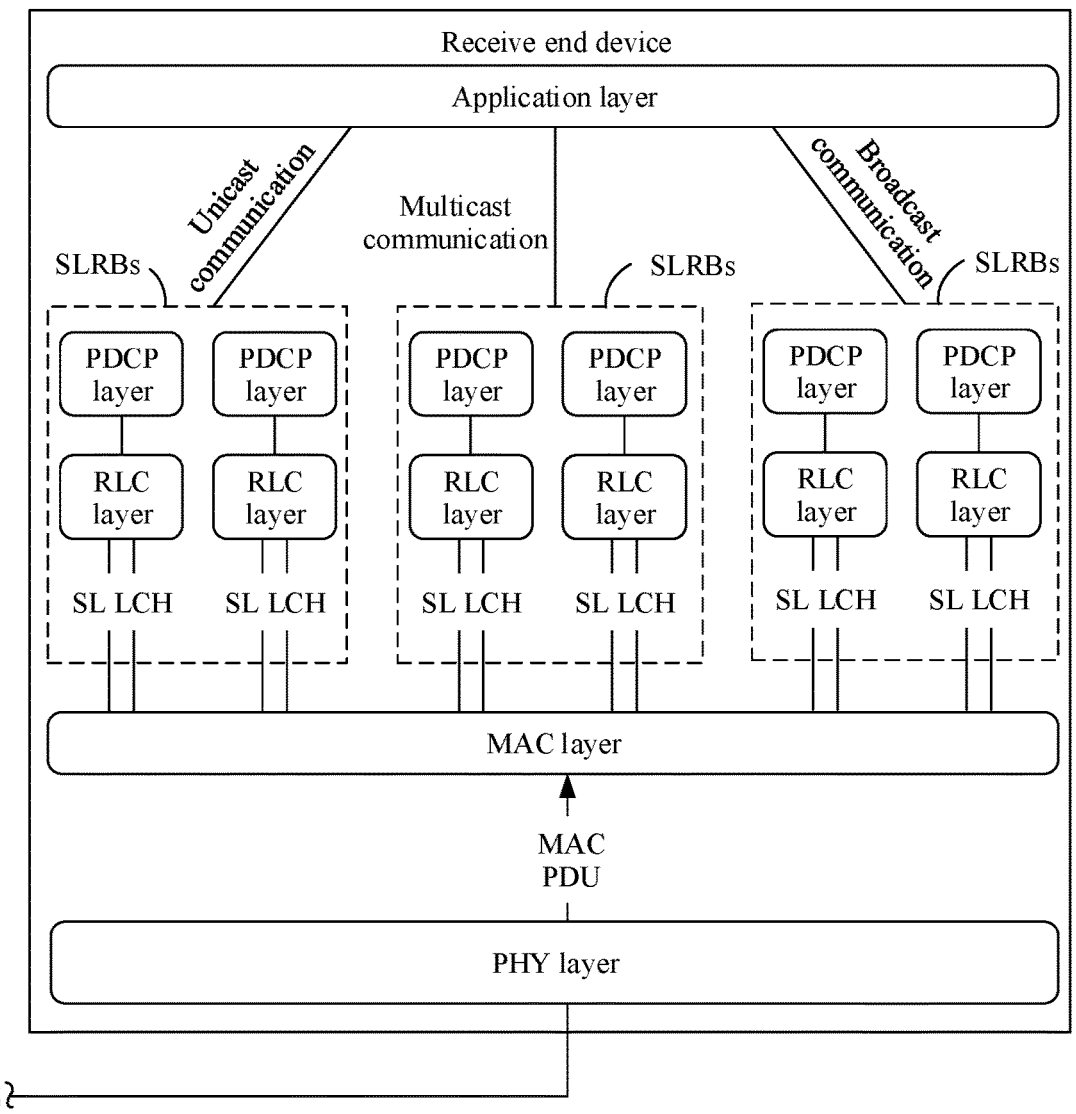

First, a principle of the embodiments of this application is described with reference to FIG. 1A and FIG. 1B. As shown in FIG. 1A and FIG. 1B, a process of transmitting data between a transmit end device and a receive end device may include: When an application layer entity of the transmit end device generates a data packet corresponding to a type of V2X traffic and delivers the data packet to a lower-layer entity, the data packet may carry information such as a second target side identifier (for example, a destination layer 2 identifier (destination layer-2 id)) and/or a communication type used to identify the type of V2X traffic; the lower-layer entity of the transmit end device may deliver, based on a mapping relationship between the information such as the second target side identifier and/or the communication type and a sidelink radio bearer (SLRB) group (SLRBs), the data packet to an SLRB that is in the transmit device and that corresponds to the information such as the second target side identifier and/or the communication type; the SLRB in the transmit device processes the received data packet, and delivers the processed data to a media access control (MAC) layer entity of the transmit device; the MAC layer entity of the transmit device processes the data packet processed by the SLRB, to generate a MAC protocol data unit (PDU) including the second target side identifier and/or the communication type, and a logical channel identity (LCID) of a sidelink logical channel (SL LCH), and delivers the MAC PDU to a physical layer (PHY) entity of the transmit device; the PHY layer entity of the transmit device sends the MAC PDU to the receive end device through a direct channel (for example, a PC5 interface) between the transmit end device and the receive end device. When the PHY layer entity sends the MAC PDU to the receive end device, the transmit end device may send, to the receive end device, sidelink control information (SCI) corresponding to the MAC PDU. The SCI may include a first target side identifier (for example, a destination layer 1 identifier (destination layer-1 id)) and/or a communication type corresponding to the MAC PDU. Subsequently, after the receive end device receives and parses the SCI, the receive end device may determine, based on the first target side identifier and/or the communication type included in the SCI, whether to receive the MAC PDU. Alternatively, the PHY layer entity of the receive end device may determine, after receiving the MAC PDU and based on the second target side identifier and/or the communication type carried in the MAC PDU, whether to deliver a MAC service data unit (SDU) included in the MAC PDU to the SLRB that is in the receive end device and that corresponds to the type of V2X traffic for processing.

In a possible implementation, that the receive end device may determine, based on the first target side identifier and/or the communication type included in the SCI, whether to receive the MAC PDU includes: If the first target side identifier and/or the communication type included in the SCI are/is a first target side identifier and/or a communication type supported by the receive end device, the receive end device receives the MAC PDU. If the first target side identifier and/or the communication type included in the SCI are/is not the first target side identifier and/or the communication type supported by the receive end device, the receive end device does not receive the MAC PDU.

In a possible implementation, that the PHY layer entity of the receive end device may determine, after receiving the MAC PDU and based on the second target side identifier and/or the communication type carried in the MAC PDU, whether to deliver a MAC SDU included in the MAC PDU to the SLRB that is in the receive end device and that corresponds to the type of V2X traffic for processing includes: After receiving the MAC PDU, the PHY layer entity of the receive end device may deliver the MAC PDU to a MAC entity. If the second target side identifier and/or the communication type carried in the MAC PDU are/is the second target side identifier and/or the communication type supported by the MAC entity of the receive end device, the receive end device delivers the MAC SDU included in the MAC PDU to the SLRB that is in the receive end device and that corresponds to the type of V2X traffic for processing. If the second target side identifier and/or the communication type carried in the MAC PDU are/is not the second target side identifier and/or the communication type supported by the MAC entity of the receive end device, the receive end device discards the MAC SDU.

Optionally, in this embodiment of this application, the first target side identifier and/or the communication type, and the second target side identifier and/or the communication type may alternatively be one or more of the following information: public land mobile network (PLMN) identifier information, sidelink/Uu interface communication information, sidelink/Uu interface information, carrier/frequency identifier information, network device/cell/core network element identifier information, service identifier information, terminal device identifier information, quality of service (QoS) identifier information, connection identifier information in a unicast connection, group identifier information in a multicast connection, traffic identifier information in unicast/multicast/broadcast, communication mode identifier information, bandwidth part (BWP) identifier information, logical channel group (LCG) identifier information, LCH identifier information, SLRB identifier information, communication source identifier information, communication target identifier information, and hybrid automatic repeat request (HARQ) process identifier information. The embodiments of this application are described only by using the first target side identifier and/or the communication type, and the second target side identifier and/or the communication type as an example. For another type of information, refer to a communication method provided in the embodiments of this application.

The PLMN identifier information is used to identify a PLMN. The sidelink/Uu interface communication system information is used to identify a communication system (for example, an LTE system, an NR system, or a next-generation communication system) in which a sidelink/Uu link is located. The sidelink/Uu interface information is used to identify a sidelink/Uu interface. The carrier/frequency identifier information is used to identify a carrier/frequency. The network device/cell/core network element identifier information is used to identify a network device/cell/core network element. The service identifier information (for example, a service id) is used to identify traffic information, so that the network device can configure a parameter, configure a resource pool, send scheduling information, or the like for the transmit end device based on the service identifier information. The terminal device identifier information may be one or more identifiers of a terminal device, or an identifier of another terminal device that belongs to a same group, in multicast, to which the terminal device serving as a proxy terminal device belongs and that is sent by the terminal device (for example, an IP address of the terminal device, a MAC address of the terminal device, a sidelink layer 2 identifier of the terminal device, a sidelink layer 2 address of the terminal device, a sidelink layer 1 identifier of the terminal device, a sidelink layer 1 address of the terminal device, a user traffic identifier (C-RNTI), a paging identifier (P-RNTI), an identifier (CS-RNTI) used to identify a semi-persistent scheduling/resource configuration/scheduling-free terminal device, a resource block identifier (RA-RNTI) used by a user to send a random access preamble, an international mobile subscriber identity (IMSI), or a temporary mobile subscriber identity (TMSI)). The QoS identifier information may include a 5th generation (5G) quality of service identifier (5G QoS identifier, 5QI), a quality of service flow identifier (QoS flow identifier, QFI), a prose per-packet priority (PPPP), prose per-packet reliability (PPPR), a QoS flow identifier, a vehicle communication quality of service identifier (VQI), or a PC5 interface quality of service identifier (PC5 QoS identifier, PQI). The connection identifier information in the unicast connection is used to identify a connection (for example, a connection id) in the unicast connection. The group identifier information in the multicast connection is used to identify a group (for example, a group connection id, a group Uu/SL L1/L2 Id, or a group Id) in the multicast connection. The traffic identifier information in the unicast/multicast/broadcast is used to identify traffic in the unicast/multicast/broadcast. The communication mode identifier information is used to identify a communication mode (for example, a network device scheduling mode or a terminal device contention mode). The bandwidth part (BWP) identifier information is used to identify a BWP. The LCG identifier information is used to identify an LCG. The LCH identifier information is used to identify an LCH. The SLRB identifier information is used to identify an SLRB. The communication source identifier information is used to identify a communication source (for example, a source Uu/SL id or a source L2/L1 id). The communication target identifier information is used to identify a communication target (for example, a destination Uu/SL id or a destination L2/L1 id). The HARQ process identifier information is used to identify a HARQ process (for example, a HARQ process id).

Optionally, in the embodiments of this application, a transmit device and a receive device are relative concepts. The transmit device may be a device for sending a data packet, and the receiving device may be a device for receiving a data packet.

Optionally, in the embodiments of this application, the communication type may be a type of communication other than unicast communication, multicast communication, or broadcast communication. In the embodiments of this application, only unicast communication, multicast communication, and broadcast communication are used as examples for description. For another type of communication, refer to the communication method provided in the embodiments of this application.

Optionally, if a receive end device communicates with a transmit end device through unicast/multicast/broadcast, an application layer (APP layer) entity and/or a V2X layer entity of the receive end device may send a notification message to an access stratum (AS) entity of the receive end device. The notification message may include a second source side identifier (for example, a Source Layer-2 Id of the transmit end device) corresponding to a unicast/multicast/broadcast connection, a second target side identifier, and a communication type, so that the AS entity of the receive end device performs data packet filtering.

For example, if the transmit end device communicates with the receive end device through unicast, an application layer entity of the transmit end device sets up a unicast connection to the application layer entity of the receive end device, and the application layer entity of the receive end device sends a notification message to the access stratum entity of the receive end device. The notification message includes the second source side identifier, the second target side identifier, and the communication type that correspond to the unicast connection. The receive end device may receive traffic data having the same second source side identifier, second target side identifier, and communication type.

For example, if the transmit end device communicates with the receive end device through multicast, when the receive end device joins a group, the application layer entity and/or the V2X layer entity of the receive end device may send a notification message to the access stratum entity of the receive end device. The notification message includes the second source side identifier, the second target side identifier, and the communication type that correspond to the multicast connection. The receive end device may receive traffic data having the same second source side identifier, second target side identifier, and communication type.

For example, if the transmit end device communicates with the receive end device through broadcast, the application layer entity of the receive end device sends a notification message to the access stratum entity of the receive end device. The notification message includes the second source side identifier, the second target side identifier, and the communication type that correspond to the broadcast communication. The receive end device may receive traffic data having the same second source side identifier, the second target side identifier, and the communication type.

Optionally, a sidelink radio bearer group may be referred to as an SLRB group, SLRBs, a radio bearer group, or an RB group. The following describes the communication method provided in the embodiments of this application by using an example in which the sidelink radio bearer group is the SLRB group or SLRBs.

First, to facilitate understanding of the embodiments of this application, some terms in the embodiments of this application are described.

SLRBs: The SLRBs may include one or more independent radio bearers, and the radio bearer may be referred to as the SLRB. The one or more independent radio bearers may be sidelink signaling radio bearers (SL-SRBs) or sidelink data radio bearers (SL-DRBs). Each SLRB corresponds to one packet data convergence protocol (PDCP) layer entity, one or more radio link control (RLC) layer entities, one or more LCHs, or the like. Alternatively, it may be described as that each SLRB includes one PDCP layer entity, one or more RLC layer entities, one or LCHs, and the like. In the embodiments of this application, each SLRB uses a set of independent configurations, and the configurations of the SLRBs vary with different second target side identifiers and/or different communication types corresponding to the SLRBs. Configuration information of the SLRBs may include a configuration of each SLRB in the SLRBs, and the configuration of the SLRB may include an SLRB identifier, a PDCP entity configuration, an RLC entity configuration, an LCH configuration, and the like. For example, the SLRB identifier may be used to identify the SLRB, and may be an index number of the SLRB. SLRBs included in same SLRBs may have a same configuration or different configurations. For example, one SLRB group includes eight SLRBs, and IDs of LCHs corresponding to the eight SLRBs may be different. If the SLRB is an SL-DRB, configuration information of the SLRB may further include: information about a mapping relationship from a QoS flow to the SL-DRB. All QoS flows have a same QoS parameter, and the QoS parameter may be a 5G quality of service identifier (5G QoS identifier, 5QI), a quality of service flow identifier (QoS flow identifier, QFI), a V2X quality of service identifier (V2X QoS identifier, VQI), or another QoS parameter that can reflect reliability, a latency, a priority, or a transmission rate of traffic.

PDCP entity configuration: For the PDCP layer entity configuration, the PDCP entity configuration may include but is not limited to any one or more of the following configuration parameters: timing duration of a timer (discardTimer) for controlling duration during which one PDCP SDU can be stored in a PDCP buffer, timing duration of a timer (t-Reordering) for waiting for an out-of-order data packet in a reordering function, whether a PDCP layer can deliver out-of-order data packets to an upper layer, whether sidelink data compression is performed at the PDCP layer, configuration information related to the sidelink data compression, a length of a sequence number (SN) used for a PDU at the PDCP layer, a security configuration used for the PDCP layer entity (the security configuration includes whether encryption and/or integrity protection are/is used), security algorithms (an integrity protection algorithm and an encryption algorithm) and/or a key used for the PDCP layer entity, whether a duplication mechanism is used for the PDCP layer entity and a duplication configuration (if the duplication mechanism is used, the PDCP entity may correspond to two or more RLC entities and LCHs), a related configuration of a header compression algorithm at the PDCP layer (for example, whether header compression is used), and the like. For example, the configuration information related to the sidelink data compression may include a size of a compressed buffer and a dictionary used for the compression. The duplication mechanism refers to a mechanism in which a PDCP entity duplicates a PDCP PDU and delivers the duplicated PDCP PDU to two or more associated RLC entities for processing and transmission.

RLC entity configuration: For the RLC layer entity configuration, the RLC entity configuration may include but is not limited to any one or more of the following configuration parameters: a mode used by the RLC layer entity: a transparent mode (TM)/an unacknowledged mode (UM)/an acknowledged mode (AM). If the RLC layer entity is configured to use the AM mode, the RLC entity configuration further includes any one or more of the following: an SN length of a PDU at an RLC layer, timing duration of a timer (t-PollRetransmit) for controlling initiation of poll retransmission, a parameter (poll PDU) for controlling a quantity of RLC PDUs that need to be sent before poll initiation, a parameter (poll Byte) for controlling a quantity of bytes of an RLC PDU that needs to be sent before poll initiation, and a maximum quantity of retransmissions (maxRetxThreshold) at the RLC layer. For example, the poll may mean that an RLC layer entity in a transmit device indicates, by using a poll bit in a MAC PDU, an RLC layer entity that is in a receive device and that uses the AM mode to feed back a status report. If the RLC layer entity is configured to use the UM mode, the RLC entity configuration further includes at least one of the following: an SN length of a PDU at an RLC layer. When a receiving RLC entity is configured to use the AM mode, the RLC configuration further includes any one or more of the following: an SN length of a PDU at an RLC layer, timing duration of a timer (t-Reassembly) for controlling the RLC layer to wait for segmentation, or timing duration of a timer (t-StatusProhibit) for controlling the RLC layer to avoid frequently sending status reports. When a receiving RLC entity is configured to use the UM mode, the RLC entity configuration further includes an SN length of a PDU at an RLC layer and/or timing duration of a timer (t-Reassembly) for controlling the RLC layer to wait for segmentation.

LCH configuration: The LCH configuration may include but is not limited to any one or more of the following configuration parameters: an LCH identifier; an identifier of a logical channel group to which an LCH belongs; a related parameter (a priority for performing logical channel priority processing, a prioritized bit rate (PBR), token bucket size duration (BSD), or the like); carrier information that can be used to transmit data on the LCH; resource mode information that can be used to transmit the data on the LCH (for example, a mode 1 or a mode 2, where the mode 1 corresponds to a manner in which a base station schedules a resource, and the mode 2 corresponds to a scheduling manner in which a terminal device selects a resource); parameter set (numerology) information of a resource that can be used to transmit data on the LCH (for example, one or more of parameters such as a subcarrier spacing, a cyclic prefix length, resource time domain duration, and whether a grant resource can be configured), a parameter (SR-mask) that controls whether the LCH can trigger a scheduling request (SR), a parameter (SR-DelayTimerApplied) that controls whether the LCH can delay triggering of an SR, and the like. For example, the LCH identifier is an index number of the LCH, and may be used to identify the LCH. The identifier of the logical channel group to which the LCH belongs may be an index number of the logical channel group to which the LCH belongs, and may be used to identify the logical channel group to which the LCH belongs.

Application layer entity: The application layer entity is a protocol layer entity in a device, may be referred to as an application layer or an application entity, and is mainly configured to generate an application (APP) message, a data packet corresponding to V2X traffic, or the like.

Non-access stratum (NAS) entity: The NAS entity is a protocol layer entity in a device, may be referred to as a NAS or a NAS entity, and is mainly configured to process information transmission between a terminal and a core network device, and transmitted content may be user information or control information (for example, information about setup, release, or mobility management of traffic). The NAS entity has the following functions: session management (including session setup, modification, release, and QoS negotiation), user management (including user data management, attach, and detach), security management (including authentication and encryption initialization between a user and a network), billing, and the like.

RRC layer entity: The RRC layer entity is a protocol layer entity in a device, is mainly responsible for generating an RRC message, measurement configuration, and reporting, and may be further responsible for other functions, for example, sending a dedicated NAS message and transmitting a parameter, such as terminal (UE) access capability information, that reflects quality of service of a data packet/data flow.

Service data adaptation protocol (SDAP) layer entity: The SDAP layer entity is a protocol layer entity in a device, may be referred to as an SDAP layer or an SDAP entity, and is mainly configured to maintain a mapping relationship between a QoS parameter and an SLRB. For example, the QoS parameter may be a 5th generation (5G) quality of service identifier (5G QoS identifier, 5QI), a quality of service flow identifier (QoS flow identifier, QFI), a prose per-packet priority (PPPP), or prose per-packet reliability (PPPR).

PDCP layer entity: The PDCP layer entity is a protocol layer entity in a device, may be referred to as a PDCP layer or a PDCP entity, and mainly processes an RRC message from a control plane and an internet protocol (IP) packet from a data plane. Functions of the PDCP layer entity include header compression and decompression, encryption/decryption, integrity protection, transmission of user data and control plane data, reordering, and retransmission. Each PDCP layer entity has one or two corresponding RLC layer entities.

RLC layer entity: The RLC layer entity is a protocol layer entity in a device, may be referred to as an RLC layer or an RLC entity, and is mainly responsible for segmenting/cascading and reassembling an RLC service data unit (SDU), performing error correction by using an automatic repeat request (ARQ), reordering an RLC protocol data unit (PDU), detecting a duplicate packet, re-segmenting an RLC PDU, and the like.

MAC layer entity: The MAC layer entity is a protocol layer entity in a device, may be referred to as a MAC layer or a MAC entity, and is mainly responsible for matching a logical channel and a transport channel, multiplexing a plurality of MAC SDUs belonging to one logical channel or different logical channels onto a same MAC PDU, delivering the multiplexed MAC SDU to a PHY (physical) layer entity, performing error correction by using a hybrid automatic repeat request (HARQ), and performing scheduling processing, logical channel priority processing, scheduling information reporting, random access process processing, and the like.

PHY layer entity: The PHY layer entity is a protocol layer entity in a device, may be referred to as a PHY layer entity or a PHY entity, and may provide mechanical, electrical, functional, and procedural features for creating, maintaining, and removing a physical link required for data transmission. In brief, the PHY layer entity ensures that original data can be transmitted over a variety of physical media.

The following describes the technical solutions in the embodiments of this application with reference to the accompanying drawings in the embodiments of this application.

The communication method provided in the embodiments of this application may be applied to any communication system for device-to-device direct communication, for example, is applicable to a device-to-device (D2D) communication system, a machine-to-machine (M2M) communication system, or a V2X communication system. The following describes the communication method provided in the embodiments of this application by using a V2X communication system as an example. For an implementation process of the communication method in another communication system, refer to the descriptions in the embodiments of this application.

Figure 2:
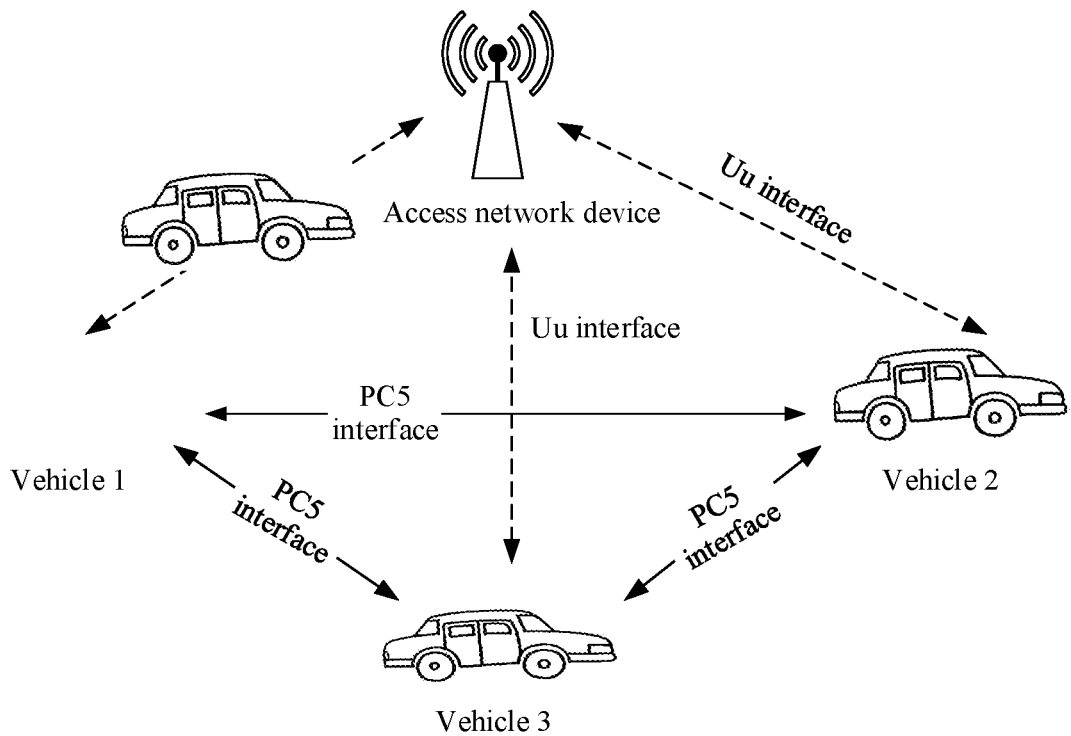
FIG. 2 is a schematic diagram of a system architecture according to an embodiment of this application.

FIG. 2 is a V2X communication system according to an embodiment of this application. As shown in FIG. 2, the V2X communication system may include a plurality of vehicles (for example, a vehicle 1, a vehicle 2, a vehicle 3 . . . shown in FIG. 2). A direct communication link may be set up between a vehicle and a surrounding vehicle to implement direct communication. For example, the vehicle 1 and the vehicle 2 may be in direct communication. For example, a direct communication link set up between vehicles may be defined as a sidelink (SL), and an interface for direct communication between a vehicle and a surrounding vehicle may be referred to as a PC5 interface. The V2X communication system shown in FIG. 2 may further include a radio access network device. A vehicle may send a V2X message to a peer vehicle through forwarding by the radio access network device, or access a network through the radio access network device. For example, the vehicle 1 may send a V2X message to the radio access network device, and the radio access network device sends the V2X message to the vehicle 2. For example, an interface between the vehicle and the radio access network device may be referred to as a Uu interface. Optionally, an architecture of the network shown in FIG. 2 is merely an example architectural diagram, and a quantity of network elements included in the V2X communication system shown in FIG. 2 is not limited in the embodiments of this application. In addition, although not shown, in addition to the network functional entity shown in FIG. 2, the network shown in FIG. 2 may further include another functional entity, such as an application server (application server) or a core network device. This is not limited.

Figure 3A:
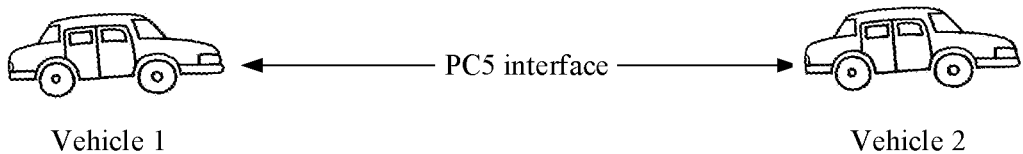
FIG. 3$a$ is a schematic diagram of unicast communication according to an embodiment of this application.
Figure 3B:
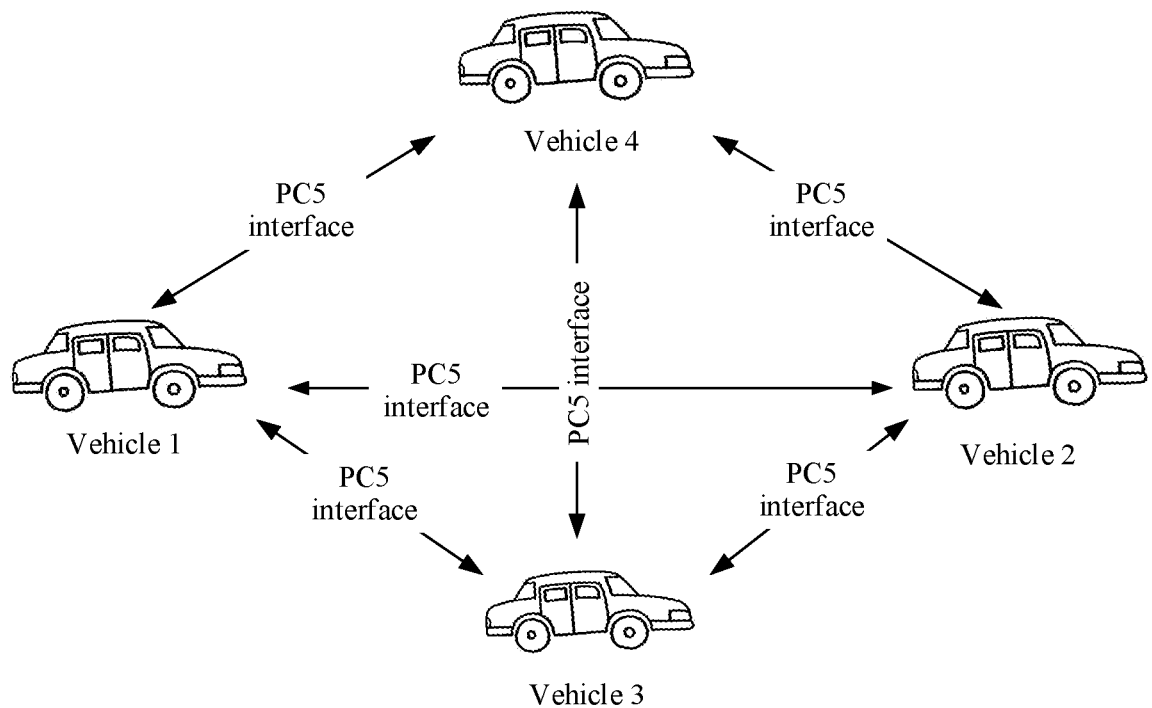
Figure 3C:
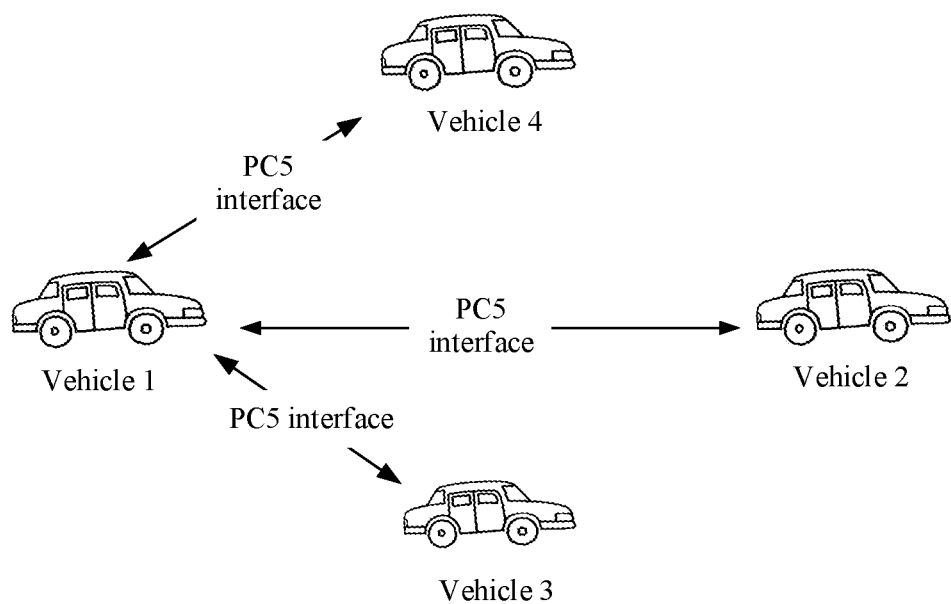

For example, the vehicle in FIG. 2 is not limited to any type of vehicle such as an automobile, a bicycle, an electric vehicle, an airplane, a ship, a train, or a high-speed railway. The vehicle may include a vehicle-mounted device that can communicate directly with another device. The vehicle-mounted device may be referred to as user equipment (UE) or a terminal device (terminal). The vehicle may be connected one-to-one to another vehicle in the V2X communication system, that is, in unicast communication, or may perform multicast communication with a plurality of other vehicles in the V2X communication system, or may perform broadcast communication with a plurality of other vehicles in the V2X communication system. For example, FIG. 3a is a schematic diagram of unicast communication according to an embodiment of this application. As shown in FIG. 3a, a vehicle 1 may be connected one-to-one to a vehicle 2 to perform unicast communication. FIG. 3b is a schematic diagram of multicast communication according to an embodiment of this application. As shown in FIG. 3b, a vehicle 1 and three other vehicles (a vehicle 2, a vehicle 3, and a vehicle 4) may form a communication group, and the vehicles in the communication group perform multicast communication. FIG. 3c is a schematic diagram of broadcast communication according to an embodiment of this application. As shown in FIG. 3c, a vehicle 1 may broadcast data to three other vehicles (a vehicle 2, a vehicle 3, and a vehicle 4). In the embodiments of this application, an example in which the vehicle is a terminal device is used for description. An apparatus configured to implement a function of the terminal device may be the terminal device itself, or may be an apparatus, for example, a chip system, that can support the terminal device in implementing the function. In the embodiments of this application, the chip system may include a chip, or may include a chip and another discrete component.

The radio access network device in FIG. 2 is mainly configured to implement functions such as a radio physical control function, resource scheduling and radio resource management, radio access control, and mobility management. The radio access network device may be an access network (AN) device/a radio access network (RAN) device, may be a device including a plurality of 5G-AN/5G-RAN nodes, or may be any node of a NodeB (NB), an evolved NodeB (eNB), a next generation NodeB (gNB), a transmission reception point (TRP), a transmission point (TP), or another access node. In the embodiments of this application, an apparatus configured to implement a function of the radio access network device may be the radio access network device, or may be an apparatus, for example, a chip system, that can support the radio access network device in implementing the function. In the technical solutions provided in the embodiments of this application, an example in which the apparatus configured to implement the function of the radio access network device is the radio access network device is used to describe the technical solutions provided in the embodiments of this application.

Figure 4:
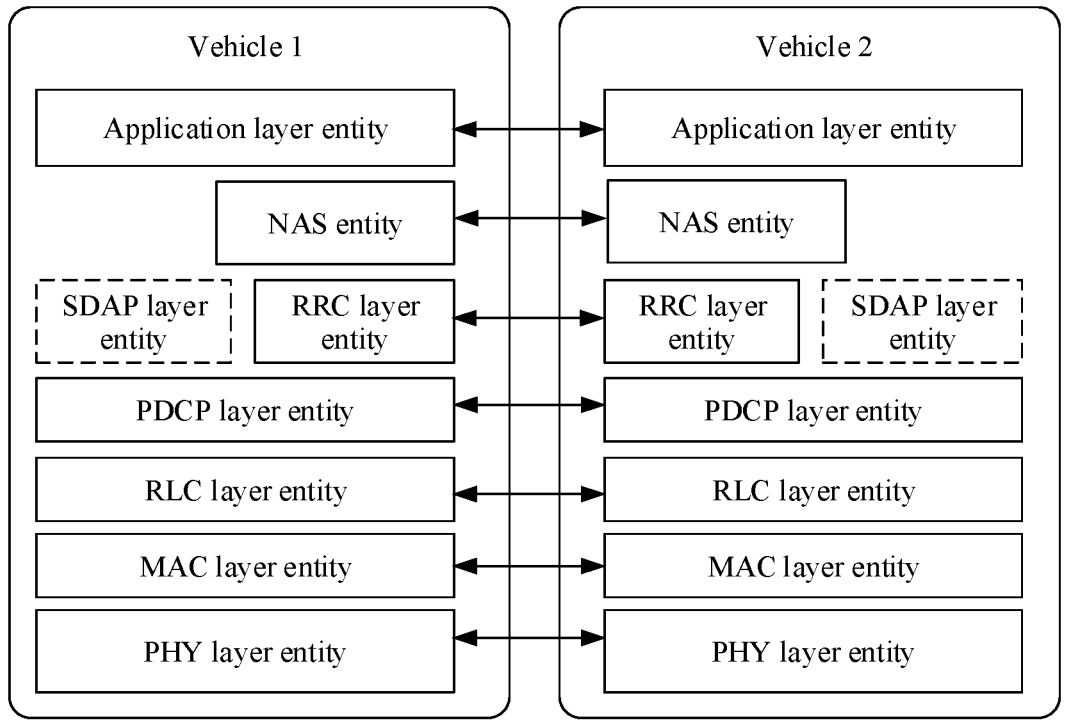
FIG. 4 is a schematic diagram of a protocol stack according to an embodiment of this application.

For example, each vehicle shown in FIG. 2 may include protocol layer entities shown in FIG. 4: an application layer entity, a non-access stratum (NAS) entity, a radio resource control (RRC) layer entity, a packet data convergence protocol (PDCP) layer entity, a radio link control (RLC) layer entity, a MAC layer entity, and a PHY layer entity, and may further include an SDAP layer entity, a V2X layer entity, another newly added protocol layer entity (not shown in FIG. 4), and the like. Related function descriptions and configurations of the protocol layer entities are described above. Details are not described again. The MAC layer entity, the RLC layer entity, and the PDCP layer entity may form a data link entity, which is referred to as a layer 2 (L2). A vehicle may process a transmitted signaling message or data packet by using the protocol layer entity shown in FIG. 4. For example, data packet transmission between a vehicle 1 and a vehicle 2 shown in FIG. 4 is used as an example. RRC layer entities of the vehicle 1 and the vehicle 2 may separately set up corresponding SLRBs for multicast communication, unicast communication, and broadcast communication, and maintain a correspondence between the unicast communication/multicast communication/broadcast communication and the SLRBs. When the vehicle 1 sends a data packet corresponding to the multicast communication to the vehicle 2, the vehicle 1 may deliver, based on the correspondence, the data packet to the SLRBs corresponding to the multicast communication for processing, and send the processed data packet to the vehicle 2 through a PC5 interface. After receiving the data packet, a MAC layer entity of the vehicle 2 delivers the data packet to the SLRBs that corresponds to the multicast communication and that is in the vehicle 2 for processing. A process in which the vehicle 1 sends a data packet corresponding to the unicast communication to the vehicle 2 and a process in which the vehicle 1 broadcasts a corresponding data packet to the vehicle 2 are similar to the foregoing process. Details are not described again. Correspondingly, as a reverse process of sending a data packet by the vehicle 1 to the vehicle 2, when the vehicle 2 sends a data packet to the vehicle 1, the vehicle 2 may deliver, based on the correspondence between the unicast communication/multicast communication/broadcast communication and the SLRBs, the data packet to the SLRBs corresponding to the unicast communication/multicast communication/broadcast communication for processing, and send the processed data packet to the vehicle 1 through the PC5 interface. After receiving the data packet, a MAC layer entity of the vehicle 1 delivers the data packet to the SLRBs that correspond to the unicast communication/multicast communication and that is in the vehicle 1 for processing.

Optionally, names of the network elements, the interfaces between the network elements, and the protocol layer entities in the architecture shown in FIG. 2 are merely examples, and the network elements, the interfaces between the network elements, and the protocol layer entities may have other names during specific implementation. This is not specifically limited in the embodiments of this application.

Figure 5:
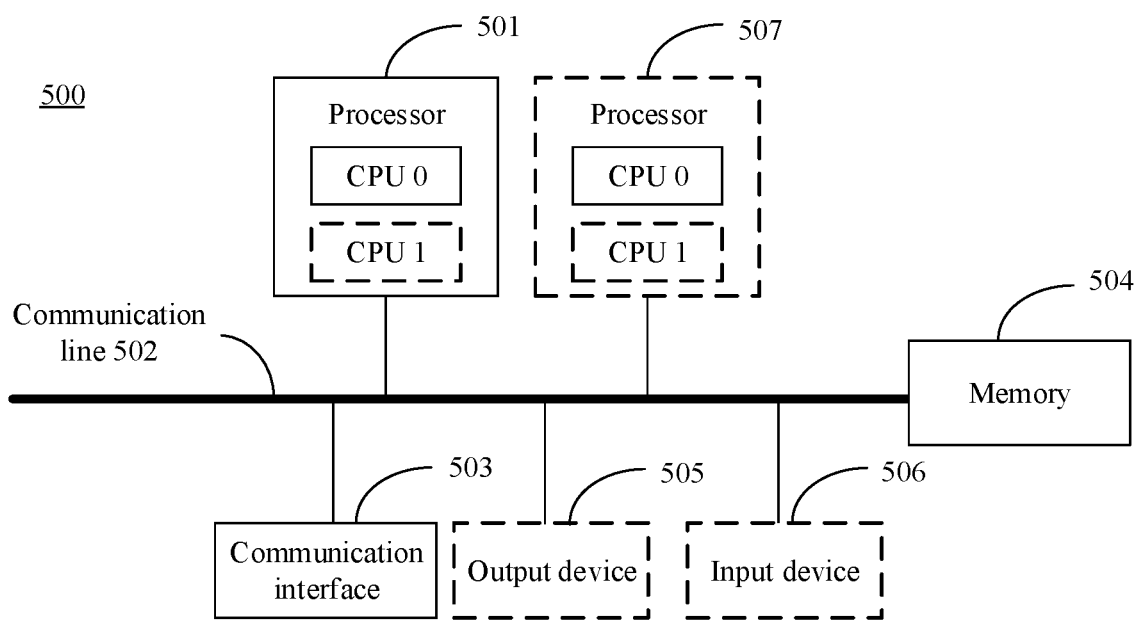
FIG. 5 is a schematic composition diagram of a communication apparatus according to an embodiment of this application.

For example, the vehicle in FIG. 2 may be considered as a communication apparatus shown in FIG. 5 or includes the communication apparatus shown in FIG. 5. FIG. 5 is a schematic composition diagram of a communication apparatus 500 according to an embodiment of this application. The communication apparatus may be configured to implement the communication method provided in the embodiments of this application. As shown in FIG. 5, the communication apparatus 500 includes at least one processor 501, a communication line 502, and at least one communication interface 503. Further, the communication apparatus 500 may include a memory 504. For example, the processor 501, the memory 504, and the communication interface 503 may be connected through the communication line 502. In the embodiments of this application, "at least one" may be one, two, three, or more. This is not limited in the embodiments of this application.

In this embodiment of this application, the processor 501 may be a central processing unit (CPU), a general-purpose processor, a network processor (NP), a digital signal processor (DSP), a microprocessor, a microcontroller, a programmable logic device (PLD), or any combination thereof. The processor may alternatively be any other apparatus having a processing function, for example, a circuit, a component, or a software module.

In this embodiment of this application, the communication line 502 may include a path, used to transmit information between the components included in the communication apparatus.

In this embodiment of this application, the communication interface 503 is configured to communicate with another device or communication network (for example, the Ethernet, a radio access network (RAN), or a wireless local area network (WLAN)). The communication interface 503 may be a module, a circuit, a transceiver, or any apparatus that can implement communication.

In this embodiment of this application, the memory 504 may be a read-only memory (ROM) or another type of static storage device that can store static information and/or instructions, or may be a random access memory (RAM) or another type of dynamic storage device that can store information and/or instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto.

In a possible design, the memory 504 may be independent of the processor 501. To be specific, the memory 504 may be a memory outside the processor 501. In this case, the memory 504 may be connected to the processor 501 through the communication line 502, and is configured to store instructions or program code. When invoking and executing the instructions or the program code stored in the memory 504, the processor 501 can implement a communication method provided in the following embodiment of this application. In another possible design, the memory 504 may alternatively be integrated with the processor 501. To be specific, the memory 504 may be an internal memory of the processor 501. For example, the memory 504 is a cache, and may be configured to temporarily store some data, instruction information, and/or the like.

In an implementation, the processor 501 may include one or more CPUs, for example, a CPU 0 and a CPU 1 in FIG. 5. In another implementation, the communication apparatus 500 may include a plurality of processors, for example, the processor 501 and a processor 507 in FIG. 5. In still another possible implementation, the communication apparatus 500 may further include an output device 505 and an input device 506. For example, the input device 506 may be a device such as a microphone or a joystick, and the output device 505 may be a device such as a display screen or a speaker.

The following describes in detail the communication method provided in the embodiments of this application with reference to FIG. 2 to FIG. 4. Optionally, in the following embodiments of this application, names of messages between network elements, names of parameters in messages, or the like are merely examples, and there may be other names in specific implementations. This is not specifically limited in the embodiments of this application.

It may be understood that in the embodiments of this application, a terminal device and/or a network device may perform some or all operations in the embodiments of this application. These steps or operations are merely examples. In the embodiments of this application, other operations or variations of various operations may be further performed. In addition, the steps may be performed in a sequence different from a sequence presented in the embodiments of this application, and not all the operations in the embodiments of this application may be performed.

Figure 6:
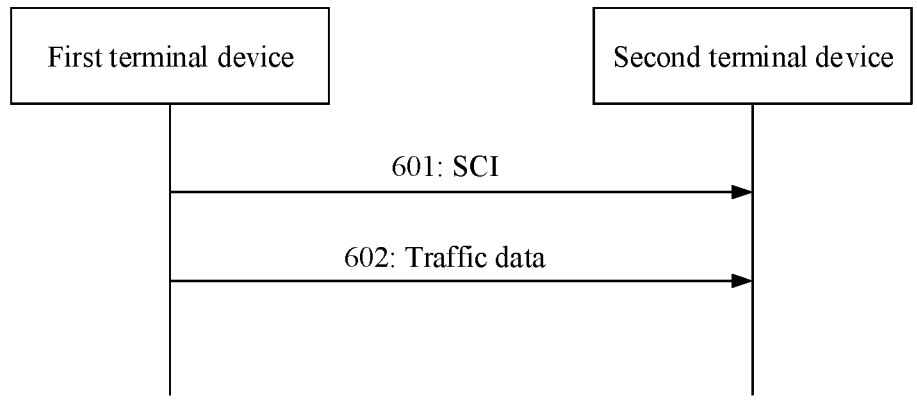
FIG. 6 is a first schematic flowchart of a communication method according to an embodiment of this application.

FIG. 6 is a flowchart of a communication method according to an embodiment of this application. As shown in FIG. 6, the method may include steps 601 and 602.

Step 601: A first terminal device sends SCI to a second terminal device.

For example, the first terminal device may be any vehicle in the V2X system shown in FIG. 2, and may set up the unicast communication shown in FIG. 3a, the multicast communication shown in FIG. 3b, or the broadcast communication shown in FIG. 3c with another vehicle. The first terminal device may include the protocol layer entities shown in FIG. 4.

Optionally, when the first terminal device sends traffic data to the second terminal device, the PHY entity of the first terminal device generates SCI corresponding to the traffic data, and sends the SCI to the second terminal device. The SCI may include a first target side identifier and a communication type, or the SCI may include the communication type, or the SCI may include a first source side identifier, the first target side identifier, and the communication type.

The first source side identifier may be a source layer 1 identifier of the first terminal device. For example, the first source side identifier may be a Source layer1 Id of the first terminal device.

The first target side identifier may be a destination layer 1 identifier, for example, a destination layer-1 id.

In the embodiments of this application, the communication type may be the unicast communication shown in FIG. 3a, the multicast communication shown in FIG. 3b, or the broadcast communication shown in FIG. 3c. In the embodiments of this application, the communication type may be binary bits "00", "01", or "10", and is used to indicate a type of communication to be performed by the first terminal device. For example, "00" may be used to indicate the unicast communication, "01" may be used to indicate the multicast communication, and "10" may be used to indicate the broadcast communication.

Optionally, the first terminal device determines the traffic data based on a second target side identifier and the communication type. The second target side identifier may be used to identify the traffic data. There is a correspondence between the second target side identifier and the first target side identifier. For example, the first target side identifier may be lower eight bits of the second target side identifier.

Optionally, the second target side identifier may be a target_id, a group_id, or a service_id. The second target side identifier may be allocated by an application layer entity of a lead vehicle initiating the unicast communication, the multicast communication, or the broadcast communication, or allocated by another protocol layer entity (for example, a NAS entity) of the lead vehicle initiating the unicast communication, the multicast communication, or the broadcast communication. Second target side identifiers allocated to different communication types are different. In this embodiment of this application, the lead vehicle initiating the unicast communication, the multicast communication, or the broadcast communication may be the first terminal device.

Optionally, if the communication type is the unicast communication, the second target side identifier is the target_id. For example, assuming that a vehicle 1 is a lead vehicle initiating the unicast communication, and the vehicle 1 and a vehicle 2 form the unicast communication, for the vehicle 1, the second target side identifier corresponding to the unicast communication may be a target_id1 allocated by an application layer entity of the vehicle 1.

Optionally, if the communication type is the multicast communication, the second target side identifier is the group_id. For example, assuming that a vehicle 1 is a lead vehicle initiating the multicast communication, and the vehicle 1 performs multicast communication with a vehicle 2, a vehicle 3, and a vehicle 4, for the vehicle 1 and the vehicle 2, the second target side identifier corresponding to the multicast communication may be a group_id1 allocated by an application layer entity of the vehicle 1; for the vehicle 1, the vehicle 3, and the vehicle 4, the second target side identifier corresponding to the multicast communication may be a group_id2 allocated by the application layer entity of the vehicle 1.

Optionally, if the communication type is the broadcast communication, the second target side identifier is the service_id. For example, assuming that a vehicle 1 initiates the broadcast communication, for the vehicle 1, the second target side identifier corresponding to the broadcast communication may be a service_id1 allocated by a communication system (for example, a 3GPP communication system).

It should be noted that, an application layer entity of the first terminal device generates one or more data packets having different second target side identifiers and different communication types, and the first terminal device obtains a first LCH, where the first LCH is an LCH having a highest priority among LCHs corresponding to data packets having a same second target side identifier and a same communication type. For the one or more first LCHs, the first terminal device determines that the traffic data includes a data packet corresponding to a first LCH having a highest priority among the one or more first LCHs.

For example, Table 1 shows second target side identifiers, communication types, and priorities corresponding to a plurality of data packets generated by the application layer entity of the first terminal device. Data packets whose second target side identifiers are a target_id1 and communication types are the unicast communication include a data packet 1, a data packet 4, and a data packet 7, and priorities corresponding to the data packet 1, the data packet 4, and the data packet 7 are 1, 2, and 3 respectively. Data packets whose second target side identifiers are a group_id1 and communication types are the multicast communication include a data packet 2 and a data packet 5, and priorities corresponding to the data packet 2 and the data packet 5 are 2. A data packet whose second target side identifier is a service_id1 and communication type is the broadcast communication is a data packet 3, and a priority corresponding to the data packet 3 is 3. A data packet whose second target side identifier is a service_id2 and communication type is the broadcast communication is a data packet 6, and a priority corresponding to the data packet 6 is 4. For the data packets whose second target side identifiers are the target_id1 and communication types are the unicast communication, an LCH corresponding to the data packet 1 has the highest priority, and the priority of the LCH is 1. For the data packets whose second target side identifiers are the group_id1 and communication types are the multicast communication, priorities of LCHs of the data packet 2 and the data packet 5 are both 2. For the data packet whose second target side identifier is the service_id1 and communication type is the broadcast communication, an LCH corresponding to the data packet 3 has the highest priority, and the priority of the LCH is 3. For the data packet whose second target side identifier is the service_id2 and communication type is the broadcast communication, an LCH corresponding to the data packet 6 has the highest priority, and the priority of the LCH is 4. The LCH corresponding to the data packet 1 has the highest priority. Therefore, the first terminal device may determine that the traffic data includes the data packet 1.

TABLE 1

| Data packet | Second target side identifier | Communication type | Priority |
| --- | --- | --- | --- |
| Data packet 1 | target_id1 | Unicast communication | 1 |
| Data packet 2 | group_id1 | Multicast communication | 2 |
| Data packet 3 | service_id1 | Broadcast communication | 3 |
| Data packet 4 | target_id1 | Unicast communication | 2 |
| Data packet 5 | group_id1 | Multicast communication | 2 |
| Data packet 6 | service_id2 | Broadcast communication | 4 |
| Data packet 7 | target_id1 | Unicast communication | 3 |

Optionally, if there is a remaining transmission resource after a transmission resource is allocated to the first LCH having the highest priority, the first terminal device may allocate the remaining transmission resource based on the second target side identifier, the communication type, and the priority. Specifically, if there is a remaining transmission resource after the transmission resource is allocated to the first LCH having the highest priority, the first terminal device sorts, in descending order of priorities, data packets having the same second target side identifier and communication type, and allocates the remaining transmission resource to the remaining data packets in the order.

For example, it is assumed that there is a remaining transmission resource after the first terminal device allocates the transmission resource to the data packet 1. The data packet 4 and the data packet 7 whose second target side identifiers are the target_id1 and communication types are the unicast communication remain, where the priority corresponding to the data packet 4 is 2, and the priority corresponding to the data packet 7 is 3. An LCH corresponding to the data packet 4 has the highest priority. Therefore, the traffic data may further include the data packet 4. If there is a remaining transmission resource after the first terminal device allocates the transmission resource to the data packet 1 and the data packet 4, the traffic data may further include the data packet 7.

Optionally, the priority is a priority of an LCH, a priority corresponding to a prose per-packet priority (PPPP), a priority corresponding to prose per-packet reliability (PPPR), a priority corresponding to a quality of service flow identifier (QoS flow identifier, QFI), a priority corresponding to a 5G quality of service identifier (5QI), a priority corresponding to a vehicle communication quality of service identifier (VQI), or a priority corresponding to a PQI.

Optionally, for a MAC PDU associated with the SCI, the MAC layer entity of the first terminal device encapsulates LCHs whose target side identifiers and communication types are the same into one transport block (TB) for sending.

For example, the MAC layer entity of the first terminal device may encapsulate LCHs corresponding to the data 1, the data 4, and the data 7 into one TB for sending.

Optionally, for a MAC PDU associated with the SCI, the MAC layer entity of the first terminal device encapsulates LCHs whose second source side identifier, second target side identifier, and communication type are the same into one transport block (TB) for sending.

Step 602: The first terminal device sends the traffic data to the second terminal device.

Optionally, the application layer entity of the first terminal device generates the traffic data, and delivers the traffic data to a lower layer. A lower layer entity processes the traffic data to generate a MAC PDU corresponding to the traffic data, and finally sends the MAC PDU to a PHY entity of the second terminal device through the PHY entity of the first terminal device. The traffic data is traffic data associated with the SCI. The traffic data is included in the MAC PDU.

Optionally, the MAC PDU includes the second target side identifier and the communication type, or the MAC PDU includes the communication type, or the MAC PDU includes the second source side identifier, the second target side identifier, and the communication type.

Optionally, the second source side identifier may be used to identify the first terminal device, and may be a source layer 2 identifier of the first terminal device. For example, the first source side identifier may be a Source Layer-2 Id of the first terminal device. There is a correspondence between the second source side identifier and the first source side identifier. For example, the first source side identifier may be lower eight bits of the second source side identifier. Optionally, the second terminal device determines, based on the communication type included in the SCI and a capability of the second terminal device for supporting the communication type, to receive the traffic data; or the second terminal device determines, based on the first target side identifier and the communication type that are included in the SCI, and a capability of the second terminal device for supporting the first target side identifier and the communication type, to receive the traffic data; or the second terminal device determines, based on the first source side identifier, the first target side identifier, and the communication type that are included in the SCI, and a capability of the second terminal device for supporting the first source side identifier, the first target side identifier, and the communication type, to receive the traffic data.

Specifically, if a communication type supported by the second terminal device is the same as the communication type included in the SCI, the second terminal device receives the traffic data; if a communication type supported by the second terminal device is different from the communication type included in the SCI, the second terminal device does not receive the traffic data. Alternatively, if a first target side identifier and a communication type that are supported by the second terminal device are the same as the first target side identifier and the communication type that are included in the SCI, the second terminal device receives the traffic data; if a first target side identifier and a communication type that are supported by the second terminal device are different from the first target side identifier and the communication type that are included in the SCI, the second terminal device does not receive the traffic data. Alternatively, if a first source side identifier, a first target side identifier, and a communication type that are supported by the second terminal device are the same as the first source side identifier, the first target side identifier, and the communication type that are included in the SCI, the second terminal device receives the traffic data; if a first source side identifier, a first target side identifier, and a communication type that are supported by the second terminal device are different from the first source side identifier, the first target side identifier, and the communication type that are included in the SCI, the second terminal device does not receive the traffic data.

For example, if a communication type supported by a PHY layer entity of the second terminal device is the same as the communication type included in the SCI, the second terminal device receives the traffic data; if a communication type supported by a PHY layer entity of the second terminal device is different from the communication type included in the SCI, the second terminal device does not receive the traffic data. Alternatively, if a first target side identifier and a communication type that are supported by a PHY layer entity of the second terminal device are the same as the first target side identifier and the communication type that are included in the SCI, the second terminal device receives the traffic data; if a first target side identifier and a communication type that are supported by a PHY layer entity of the second terminal device are different from the first target side identifier and the communication type that are included in the SCI, the second terminal device does not receive the traffic data. Alternatively, if a first source side identifier, a first target side identifier, and a communication type that are supported by a PHY layer entity of the second terminal device are the same as the first source side identifier, the first target side identifier, and the communication type that are included in the SCI, the second terminal device receives the traffic data; if a first source side identifier, a first target side identifier, and a communication type that are supported by the PHY layer entity of the second terminal device are different from the first source side identifier, the first target side identifier, and the communication type that are included in the SCI, the second terminal device does not receive the traffic data.

Optionally, the second terminal device determines, based on the communication type included in the MAC PDU and a capability of the second terminal device for supporting the communication type, to receive the traffic data; or the second terminal device determines, based on the second target side identifier and the communication type that are included in the MAC PDU, and a capability of the second terminal device for supporting the second target side identifier and the communication type, to receive the traffic data; or the second terminal device determines, based on the second source side identifier, the second target side identifier, and the communication type that are included in the MAC PDU, and a capability of the second terminal device for supporting the second source side identifier, the second target side identifier, and the communication type, to receive the traffic data.

Specifically, if a communication type supported by the second terminal device is the same as the communication type included in the MAC PDU, the second terminal device receives the traffic data; if a communication type supported by the second terminal device is different from the communication type included in the MAC PDU, the second terminal device does not receive the traffic data. Alternatively, if a second target side identifier and a communication type that are supported by the second terminal device are the same as the second target side identifier and the communication type that are included in the MAC PDU, the second terminal device receives the traffic data; if a second target side identifier and a communication type that are supported by the second terminal device are different from the second target side identifier and the communication type that are included in the MAC PDU, the second terminal device does not receive the traffic data. Alternatively, if a second source side identifier, a second target side identifier, and a communication type that are supported by the second terminal device are the same as the second source side identifier, the second target side identifier, and the communication type that are included in the MAC PDU, the second terminal device receives the traffic data; if a second source side identifier, a second target side identifier, and a communication type that are supported by the second terminal device are different from the second source side identifier, the second target side identifier, and the communication type that are included in the MAC PDU, the second terminal device does not receive the traffic data.

For example, if a communication type supported by a MAC layer entity of the second terminal device is the same as the communication type included in the MAC PDU, the second terminal device receives the traffic data; if a communication type supported by a MAC layer entity of the second terminal device is different from the communication type included in the MAC PDU, the second terminal device does not receive the traffic data. Alternatively, if a second target side identifier and a communication type that are supported by a MAC layer entity of the second terminal device are the same as the second target side identifier and the communication type that are included in the MAC PDU, the second terminal device receives the traffic data; if a second target side identifier and a communication type that are supported by a MAC layer entity of the second terminal device are different from the second target side identifier and the communication type that are included in the MAC PDU, the second terminal device does not receive the traffic data. Alternatively, if a second source side identifier, a second target side identifier, and a communication type that are supported by a MAC layer entity of the second terminal device are the same as the second source side identifier, the second target side identifier, and the communication type that are included in the MAC PDU, the second terminal device receives the traffic data; if a second source side identifier, a second target side identifier, and a communication type that are supported by a MAC layer entity of the second terminal device are different from the second source side identifier, the second target side identifier, and the communication type that are included in the MAC PDU, the second terminal device does not receive the traffic data.

Optionally, the second terminal device determines, based on the communication type included in the SCI, the communication type included in the MAC PDU, and a capability of the second terminal device for supporting the communication type, to receive the traffic data; or the second terminal device determines, based on the first target side identifier and the communication type that are included in the SCI, the second target side identifier and the communication type that are included in the MAC PDU, and a capability of the second terminal device for supporting the first target side identifier, the second target side identifier and the communication type, to receive the traffic data; or the second terminal device determines, based on the first source side identifier, the first target side identifier, and the communication type that are included in the SCI, the second source side identifier, the second target side identifier, and the communication type that are included in the MAC PDU, and a capability of the second terminal device for supporting the first source side identifier, the first target side identifier, the second source side identifier, the second target side identifier, and the communication type, to receive the traffic data.

Specifically, if a communication type supported by the second terminal device is the same as the communication type included in the SCI, and the communication type supported by the second terminal device is the same as the communication type included in the MAC PDU, the second terminal device receives the traffic data. Alternatively, if a first target side identifier and a communication type that are supported by the second terminal device are the same as the first target side identifier and the communication type that are included in the SCI, and a second target side identifier and the communication type that are supported by the second terminal device are the same as the second target side identifier and the communication type that are included in the MAC PDU, the second terminal device receives the traffic data. Alternatively, if a first source side identifier, a first target side identifier, and a communication type that are supported by the second terminal device are the same as the first source side identifier, the first target side identifier, and the communication type that are included in the SCI, and a second source side identifier, a second target side identifier, and the communication type that are supported by the second terminal device are the same as the second source side identifier, the second target side identifier, and the communication type that are included in the MAC PDU, the second terminal device receives the traffic data.

For example, if a communication type supported by a PHY layer entity of the second terminal device is the same as the communication type included in the SCI, and a communication type supported by a MAC layer entity of the second terminal device is the same as the communication type included in the MAC PDU, the second terminal device receives the traffic data. Alternatively, if a first target side identifier and a communication type that are supported by a PHY layer entity of the second terminal device are the same as the first target side identifier and the communication type that are included in the SCI, and a second target side identifier and a communication type that are supported by a MAC layer entity of the second terminal device are the same as the second target side identifier and the communication type that are included in the MAC PDU, the second terminal device receives the traffic data. Alternatively, if a first source side identifier, a first target side identifier, and a communication type that are supported by a PHY layer entity of the second terminal device are the same as the first source side identifier, the first target side identifier, and the communication type that are included in the SCI, and a second source side identifier, a second target side identifier, and a communication type that are supported by a MAC layer entity of the second terminal device are the same as the second source side identifier, the second target side identifier, and the communication type that are included in the MAC PDU, the second terminal device receives the traffic data.

Optionally, after the second terminal device receives the traffic data, the second terminal device sends feedback information to the first terminal device. The feedback information is used to indicate whether the traffic data is successfully sent. For example, if the feedback information is an ACK, it indicates that the traffic data is successfully sent. If the feedback information is a NACK, it indicates that the traffic data fails to be sent.

According to the method shown in FIG. 6, after the second terminal device receives the SCI sent by the first terminal device, if the first target side identifier and/or the communication type included in the SCI are/is the same as the first target side identifier and/or the communication type supported by the second terminal device, the second terminal device receives the traffic data, and sends the feedback information to the first terminal device. The second terminal device may receive data of the corresponding communication type, to reduce a packet receiving error rate of the second terminal device, and further improve packet receiving efficiency of the second terminal device.

Further, before the first terminal device sends the SCI, a network device may send first configuration information to the first terminal device, and the first terminal device may obtain a synchronization configuration, a sending manner, or a position of a sidelink transmission resource based on the first configuration information. The first terminal device may further configure, based on the first configuration information, an SLRB corresponding to the second target side identifier and the communication type, or configure an SLRB corresponding to the communication type.

Figure 7:
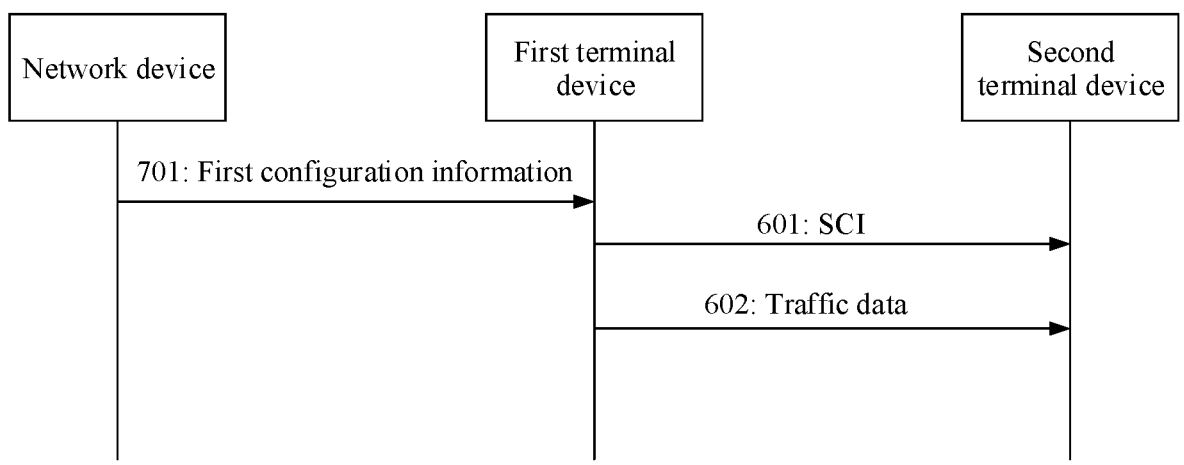
FIG. 7 is a second schematic flowchart of a communication method according to an embodiment of this application.

As shown in FIG. 7, before step 601, the communication method further includes step 701.

Step 701: The first terminal device receives the first configuration information from the network device.

Optionally, the PHY entity of the first terminal device receives the first configuration information from a PHY entity of the network device.

Optionally, the first configuration information is a system information block (SIB), radio resource control (RRC) signaling, MAC signaling, downlink control information (DCI), NAS signaling, or a V3 interface message.

Optionally, if the first configuration information is the SIB or the RRC signaling, the first configuration information is generated by an RRC layer entity of the network device. If the first configuration information is the MAC signaling, the first configuration information is generated by a MAC layer entity of the network device. If the first configuration information is the DCI, the first configuration information is generated by the PHY layer entity of the network device. If the first configuration information is the NAS signaling or the V3 interface message, the first configuration information is obtained by the network device from a core network device.

Example 1

The first configuration information includes the second target side identifier, the communication type, and second configuration information corresponding to the second target side identifier and the communication type, where the second configuration information includes sidelink configuration information and/or a scheduling resource.

The sidelink configuration information is used to indicate a synchronization configuration, a sending manner, or a position of a transmission resource. The scheduling resource includes a transmission resource corresponding to the second target side identifier and/or the communication type. The synchronization configuration may include V2X UE synchronization signal configuration information (for example, v2x-SyncConfig) and/or V2X UE synchronization configuration information (for example, typeTxSync). The sending manner includes a frequency division duplex manner or a time division duplex manner. The position of the transmission resource may be a range of the transmission resource in a resource pool. The transmission resource is a time-frequency resource used to transmit the traffic data. The scheduling resource may be a semi-persistent scheduling resource or a dynamic scheduling resource.

Optionally, the sidelink configuration information may include one or more of the following information: V2X UE receiving resource pool configuration information (for example, v2x-CommRxPool), V2X UE sending resource pool configuration information (for example, v2x-CommTx-PoolNormalCommon), pedestrian-terminal interconnection communication (P-UE to everything, P2X) UE sending resource pool configuration information (for example, p2x-CommTxPoolNormalCommon), V2X UE temporary sending resource pool configuration information (for example, v2x-CommTxPoolExceptional), V2X UE synchronization signal configuration information (for example, v2x-SyncConfig), V2X UE inter-frequency information (for example, v2x-InterFreqInfoList), V2X UE resource selection configuration information (for example, v2x-ResourceSelectionConfig), zone configuration information (for example, zoneConfig), V2X UE synchronization configuration information (for example, typeTxSync), an SL/UL (uplink) transmission priority (for example, thresSL-TxPrioritization), anchor frequency list configuration information (for example, anchorCarrierFreqList), an offset between a base station slot and a GPS time (for example, offsetDFN), and parameter configuration information (for example, cbr-CommonTxConfigList) for determining SL data sending based on an SL channel busy/idle degree measured by UE.

For example, the V2X UE temporary sending resource pool configuration information may be used from starting of data measurement to ending of the data measurement during a radio link failure (RLF), a radio link handover failure (HOF), or resource contention of the first terminal device.

For example, the V2X UE resource selection configuration information may be used when the first terminal device is in an autonomous resource contention mode.

For example, the zone configuration information is used when the first terminal device is in the autonomous resource contention mode, the first terminal device calculates a zone identifier (zone id) based on a GPS position of the first terminal device, and then uses a sending/receiving resource pool corresponding to the zone identifier.

For example, the first configuration information may be a SIB21, and the first configuration information may include the second target side identifier and the communication type, and sidelink configuration information corresponding to the second target side identifier and the communication type. The first terminal device may obtain the synchronization configuration, the sending manner, or the position of the transmission resource based on the sidelink configuration information.

For example, the V2X UE synchronization configuration information is used to indicate a priority order of a GPS, a network device, a terminal device, and the like.

For example, the SL/UL transmission priority is used to indicate whether SL data or UL data is preferentially sent. For example, if the highest PPPP value of to-be-sent SL data is less than a preset threshold, the SL data is preferentially sent; or if the highest PPPP value of to-be-sent SL data is greater than or equal to a preset threshold, the UL data is preferentially sent.

Optionally, the network device allocates a resource in a resource pool based on each piece of sidelink configuration information, each second target side identifier, and each communication type. Specifically, the network device allocates, in the resource pool, a resource to each piece of sidelink configuration information, and for the resource of each piece of sidelink configuration information, the network device allocates a resource to each second target side identifier and communication type. Alternatively, the network device allocates a resource to each second target side identifier and communication type, and for the resource of each second target side identifier and each communication type, the network device allocates a resource to each piece of sidelink configuration information.

For example, the first configuration information may be a SIB21, and the first configuration information may include mapping information of the second target side identifier, the communication type, the sidelink configuration information, and the resource pool. The mapping information of the second target side identifier, the communication type, the sidelink configuration information, and the resource pool is used to indicate a mapping relationship between the second target side identifier, the communication type, the sidelink configuration information, and the resource pool. The mapping information of the second target side identifier, the communication type, the sidelink configuration information, and the resource pool includes the second target side identifier, the communication type, and the sidelink configuration information corresponding to the second target side identifier and the communication type. The first terminal device may obtain, based on the mapping information of the second target side identifier, the communication type, the sidelink configuration information, and the resource pool, the transmission resource corresponding to the second target side identifier and the communication type. Alternatively, the first terminal device may obtain, based on the mapping information of the second target side identifier, the communication type, the sidelink configuration information, and the resource pool, the position of the transmission resource corresponding to the second target side identifier and the communication type. If the first terminal device obtains the position of the transmission resource corresponding to the second target side identifier and the communication type, the first terminal device may contend for a resource at the position of the transmission resource in a contention-based resource obtaining manner.

For example, the first configuration information may be RRC signaling, the first configuration information may include the second target side identifier, the communication type, and the second configuration information corresponding to the second target side identifier and the communication type, and the second configuration information may be a semi-persistent scheduling resource. After receiving the first configuration information, the first terminal device may send, on the semi-persistent scheduling resource, traffic data having the same second target side identifier and communication type. Specifically, after receiving the RRC signaling, the first terminal device may send, on the semi-persistent scheduling resource, the traffic data having the same second target side identifier and communication type. Alternatively, after receiving the RRC signaling, the first terminal device may send, on the semi-persistent scheduling resource after receiving DCI, the traffic data having the same second target side identifier and communication type, where the DCI is used to activate the semi-persistent scheduling resource.

Example 2

The first configuration information includes the communication type and second configuration information corresponding to the communication type.

For related descriptions of the second configuration information, refer to corresponding descriptions in the example 1. Details are not described herein again.

Optionally, the network device allocates a resource in a resource pool based on each piece of sidelink configuration information and each communication type. Specifically, the network device allocates, in the resource pool, a resource to each piece of sidelink configuration information, and for the resource of each piece of sidelink configuration information, the network device allocates a resource to each communication type. Alternatively, the network device allocates a resource to each communication type, and for the resource of each communication type, the network device allocates a resource to each piece of sidelink configuration information.

For example, the first configuration information may be a SIB21, and the first configuration information may include mapping information of the communication type, the sidelink configuration information, and the resource pool. The mapping information of the communication type, the sidelink configuration information, and the resource pool is used to indicate a mapping relationship between the communication type, the sidelink configuration information, and the resource pool. The mapping information of the communication type, the sidelink configuration information, and the resource pool includes the communication type, and the sidelink configuration information corresponding to the communication type. The first terminal device may obtain, based on the mapping information of the communication type, the sidelink configuration information, and the resource pool, the transmission resource corresponding to the communication type. Alternatively, the first terminal device may obtain, based on the mapping information of the communication type, the sidelink configuration information, and the resource pool, the position of the transmission resource corresponding to the communication type. If the first terminal device obtains the position of the transmission resource corresponding to the communication type, the first terminal device may contend for a resource at the position of the transmission resource in a contention-based resource obtaining manner.

For example, the first configuration information may be RRC signaling, the first configuration information includes the communication type, and the second configuration information corresponding to the communication type, and the second configuration information may be a semi-persistent scheduling resource. After receiving the first configuration information, the first terminal device may send, on the semi-persistent scheduling resource, traffic data having the same communication type. Alternatively, the first configuration information may be RRC signaling, the first configuration information includes the communication type and the second configuration information corresponding to the communication type, and the second configuration information may be a dynamic scheduling resource. The dynamic scheduling resource may be enabled only after the first terminal device receives DCI sent by the network device.

Example 3

The first configuration information includes the second target side identifier, the communication type, second configuration information corresponding to the second target side identifier and the communication type, QoS information, and configuration information of a sidelink radio bearer SLRB corresponding to the QoS information.

For related descriptions of the second configuration information, refer to corresponding descriptions in the example 1. Details are not described herein again.

For example, the first configuration information may be a SIB21, and the first configuration information may include the second target side identifier, the communication type, the second configuration information corresponding to the second target side identifier and the communication type, and mapping information of the QoS information and the configuration information of the sidelink radio bearer SLRB, where the mapping information of the QoS information and the configuration information of the SLRB is used to indicate a mapping relationship between the QoS information and the configuration information of the SLRB, and the mapping information of the QoS information and the configuration information of the SLRB may include the QoS information and the configuration information of the SLRB corresponding to the QoS information. The second configuration information may include sidelink configuration information and/or a scheduling resource, the sidelink configuration information is used to indicate a synchronization configuration, a sending manner, or a position of a transmission resource, and the scheduling resource includes a transmission resource corresponding to the second target side identifier and the communication type. The first terminal device may obtain the synchronization configuration, the sending manner, or the position of the transmission resource based on the sidelink configuration information, the first terminal device may obtain the transmission resource based on the scheduling resource, and the first terminal device may obtain a configuration of the SLRB based on the configuration information of the SLRB corresponding to the QoS information.

Example 4

The first configuration information includes the communication type, second configuration information corresponding to the communication type, QoS information, and configuration information of a sidelink radio bearer SLRB corresponding to the QoS information.

For related descriptions of the second configuration information, refer to corresponding descriptions in the example 1. Details are not described herein again.

For example, the first configuration information may be a SIB21, and the first configuration information may include the communication type, the second configuration information corresponding to the communication type, and mapping information of the QoS information and the configuration information of the sidelink radio bearer SLRB, where the mapping information of the QoS information and the configuration information of the SLRB is used to indicate a mapping relationship between the QoS information and the configuration information of the SLRB, and the mapping information of the QoS information and the configuration information of the SLRB may include the QoS information and the configuration information of the SLRB corresponding to the QoS information. The second configuration information may include sidelink configuration information and/or a scheduling resource, the sidelink configuration information is used to indicate a synchronization configuration, a sending manner, or a position of a transmission resource, and the scheduling resource includes a transmission resource corresponding to the communication type. The first terminal device may obtain the synchronization configuration, the sending manner, or the position of the transmission resource based on the sidelink configuration information, the first terminal device may obtain the transmission resource based on the scheduling resource, and the first terminal device may obtain a configuration of the SLRB based on the configuration information of the SLRB corresponding to the QoS information.

Example 5

The first configuration information includes QoS information, and configuration information of a sidelink radio bearer SLRB corresponding to the QoS information.

For example, the first configuration information may be a SIB21, and the first configuration information may include mapping information of the QoS information and the configuration information of the sidelink radio bearer SLRB, where the mapping information of the QoS information and the configuration information of the SLRB is used to indicate a mapping relationship between the QoS information and the configuration information of the SLRB, and the mapping information of the QoS information and the configuration information of the SLRB may include the QoS information and the configuration information of the SLRB corresponding to the QoS information. The first terminal device may obtain a configuration of the SLRB based on the configuration information of the SLRB corresponding to the QoS information.

Optionally, after receiving the first configuration information sent by the network device, the first terminal device sends feedback information to the network device, where the feedback information is used to indicate whether the first terminal device successfully receives the first configuration information. For example, if the feedback information is an ACK, it indicates that the first terminal device successfully receives the first configuration information. If the feedback information is a NACK, it indicates that the first terminal device fails to receive the first configuration information.

Optionally, the first terminal device stores the first configuration information, where the first configuration information includes the second target side identifier, the communication type, and the second configuration information corresponding to the second target side identifier and the communication type; or the first configuration information includes the communication type and the second configuration information corresponding to the communication type; or the first configuration information includes the second target side identifier, the communication type, the second configuration information corresponding to the second target side identifier and the communication type, the QoS information, and the configuration information of the sidelink radio bearer SLRB corresponding to the QoS information; or the first configuration information includes the communication type, the second configuration information corresponding to the communication type, the QoS information, and the configuration information of the sidelink radio bearer SLRB corresponding to the QoS information; or the first configuration information includes the QoS information and the configuration information of the sidelink radio bearer SLRB corresponding to the QoS information. The second configuration information includes the sidelink configuration information and/or the scheduling resource, the sidelink configuration information is used to indicate the synchronization configuration, the sending manner, or the position of the transmission resource, and the scheduling resource includes the transmission resource corresponding to the second target side identifier and/or the communication type.

Based on the method shown in FIG. 7, the first terminal device may receive the first configuration information sent by the network device, where the first configuration information includes the second configuration information and/or the configuration information of the sidelink radio bearer SLRB. The first terminal device may obtain the synchronization configuration, the sending manner, or the position of the transmission resource based on the second configuration information, and the first terminal device may further configure the SLRB based on the configuration information that is of the sidelink radio bearer SLRB and that is sent by the network device.

Further, before the first terminal device sends the SCI, the first terminal device may send traffic information to the network device, where the traffic information is used by the first terminal device to send the communication type to the network device, so that the network device allocates, to the first terminal device based on the communication type, a sidelink transmission resource corresponding to the communication type.

Figure 8:
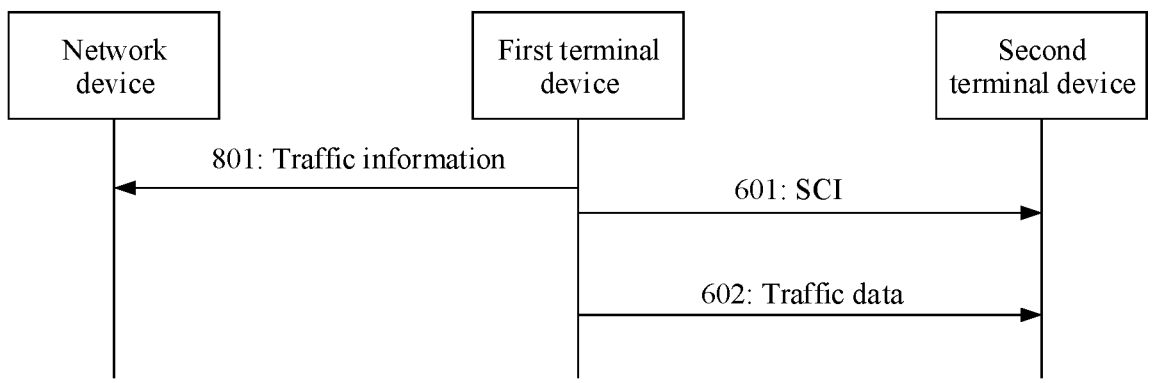
FIG. 8 is a third schematic flowchart of a communication method according to an embodiment of this application.

As shown in FIG. 8, before step 601, the communication method further includes step 801.

Step 801: The first terminal device sends traffic information to the network device.

Optionally, the RRC layer entity of the first terminal device generates the traffic information, and then the PHY entity of the first terminal device sends the traffic information to a PHY entity of the network device.

The traffic information includes the communication type.

Example 1

The first terminal device sends the traffic information to the network device, where the traffic information includes the communication type. The network device may allocate a transmission resource to the first terminal device based on the communication type. For example, the first terminal device sends the traffic information to the network device, where the traffic information includes the communication type. The network device allocates the transmission resource to the first terminal device based on a prestored correspondence between a communication type and a transmission resource; or the network device allocates the transmission resource to the first terminal device based on a correspondence that is between a communication type and a transmission resource and that is received from a core network device.

Example 2

The first terminal device sends the traffic information to the network device, where the traffic information includes the second target side identifier and the communication type. The network device may allocate a transmission resource to the first terminal device based on the second target side identifier and the communication type. For example, the first terminal device sends the traffic information to the network device, where the traffic information includes the second target side identifier and the communication type. The network device allocates the transmission resource to the first terminal device based on a prestored correspondence between a second target side identifier, a communication type, and a transmission resource; or the network device allocates the transmission resource to the first terminal device based on information about a correspondence that is between a second target side identifier, a communication type, and a transmission resource and that is received from a core network device.

Example 3

The first terminal device sends the traffic information to the network device, where the traffic information includes the communication type and a frequency corresponding to the communication type. The network device may allocate, based on the communication type and the frequency corresponding to the communication type, a transmission resource to the first terminal device at the frequency corresponding to the communication type. For example, the first terminal device sends the traffic information to the network device, where the traffic information includes the communication type and the frequency corresponding to the communication type. The network device allocates the transmission resource to the first terminal device based on a prestored correspondence between a communication type, frequency information, and a transmission resource; or the network device allocates the transmission resource to the first terminal device based on information about a correspondence that is between a communication type, frequency information, and a transmission resource and that is received from a core network device. The frequency information is used to indicate a frequency corresponding to a communication type.

Example 4

The first terminal device sends the traffic information to the network device, where the traffic information includes the second target side identifier, the communication type, and a frequency corresponding to the second target side identifier and the communication type. The network device may allocate, based on the second target side identifier, the communication type, and the frequency corresponding to the second target side identifier and the communication type, a transmission resource to the first terminal device at the frequency corresponding to the second target side identifier and the communication type. For example, the first terminal device sends the traffic information to the network device, where the traffic information includes the second target side identifier, the communication type, and the frequency corresponding to the second target side identifier and the communication type. The network device allocates the transmission resource to the first terminal device based on a prestored correspondence between a second target side identifier, a communication type, frequency information, and a transmission resource; or the network device allocates the transmission resource to the first terminal device based on information about a correspondence that is between a second target side identifier, a communication type, frequency information, and a transmission resource and that is received from a core network device. The frequency information is used to indicate a frequency corresponding to a second target side and a communication type.

Optionally, after receiving the traffic information sent by the first terminal device, the network device sends feedback information to the first terminal device, where the feedback information is used to indicate whether the network device successfully receives the traffic information.

Optionally, after receiving the traffic information sent by the first terminal device, the network device sends transmission resource configuration information to the first terminal device, where the transmission resource configuration information includes a sidelink transmission resource used to send the traffic data.

According to the method shown in FIG. 8, the first terminal device may send the traffic information to the network device, where the traffic information may include the communication type, and the network device may allocate, to the first terminal device based on the communication type, the transmission resource that corresponds to the communication type and that is used to send the traffic data.

Further, before the first terminal device sends the SCI, the first terminal device may send a buffer status report (BSR) to the network device, where the BSR is used by the first terminal device to request a sidelink transmission resource from the network device.

Figure 9:
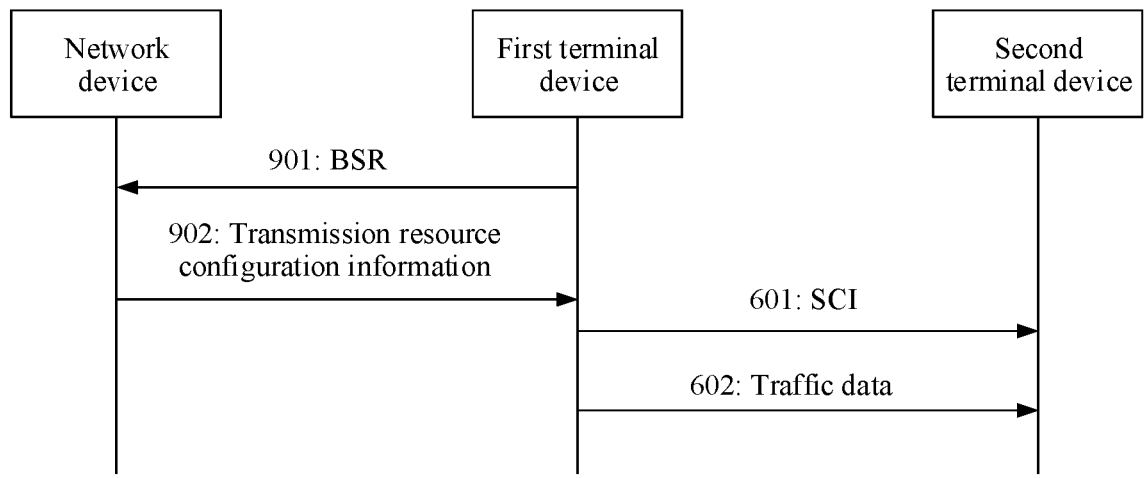
FIG. 9 is a fourth schematic flowchart of a communication method according to an embodiment of this application.

As shown in FIG. 9, before step 601, the communication method further includes steps 901 and 902.

Step 901: The first terminal device sends a buffer status report BSR to the network device.

Optionally, the MAC entity of the first terminal device generates the BSR, and the PHY entity of the first terminal device sends the BSR to a PHY entity of the network device.

The BSR includes the second target side identifier and the communication type, or includes the communication type.

Example 1

The first terminal device sends the BSR to the network device, where the BSR includes the second target side identifier and the communication type. The network device may allocate a transmission resource to the first terminal device based on the second target side identifier and the communication type. For example, the first terminal device sends the BSR to the network device, where the BSR includes the second target side identifier and the communication type. The network device may allocate the transmission resource to the first terminal device based on a prestored correspondence between a second target side identifier, a communication type, and a transmission resource; or the network device may allocate the transmission resource to the first terminal device based on information about a correspondence that is between a second target side identifier, a communication type, and a transmission resource and that is received from a core network device; or the network device may allocate, based on traffic information that is reported by the first terminal device and that includes the second target side identifier, the communication type, and a frequency corresponding to the second target side identifier and the communication type, the transmission resource to the first terminal device at the frequency.

Example 2

The first terminal device sends the BSR to the network device, where the BSR includes the communication type. The network device allocates a transmission resource to the first terminal device based on the communication type. For example, the first terminal device sends the BSR to the network device BSR, where the BSR includes the communication type. The network device may allocate the transmission resource to the first terminal device based on a prestored correspondence between a communication type and a transmission resource; or the network device may allocate the transmission resource to the first terminal device based on a correspondence that is between a communication type and a transmission resource and that is received from a core network device; or the network device may allocate, based on traffic information that is reported by the first terminal device and that includes the communication type, and a frequency corresponding to the communication type, the transmission resource to the first terminal device at the frequency.

Optionally, after receiving the BSR sent by the first terminal device, the network device sends feedback information to the first terminal device, where the feedback information is used to indicate whether the network device successfully receives the BSR.

Step 902: The first terminal device receives transmission resource configuration information sent by the network device.

Optionally, the transmission resource configuration information is DCI.

Optionally, after the network device receives the BSR, the PHY entity of the network device generates corresponding DCI and sends the corresponding DCI to the first terminal device.

The transmission resource configuration information includes a sidelink transmission resource used to send the traffic data.

According to the method shown in FIG. 9, the first terminal device may send the BSR to the network device, where the BSR may include the second target side identifier and the communication type, or the BSR may include the communication type. The network device may allocate, to the first terminal device based on the second target side identifier and the communication type, the transmission resource that corresponds to the communication type and that is used to send the traffic data. Alternatively, the network device may allocate, to the first terminal device based on the communication type, the transmission resource that corresponds to the communication type and that is used to send the traffic data.

Further, before the first terminal device sends the SCI, the first terminal device may send assistance information to the network device, where the assistance information may include traffic model information and the communication type, so that the network device allocates a scheduling resource to the first terminal device based on the assistance information.

Figure 10:
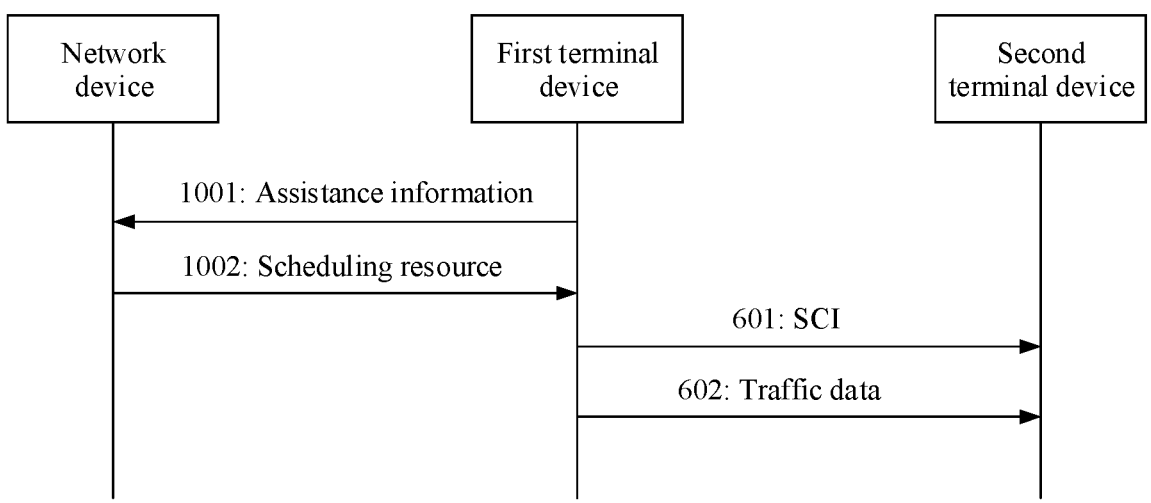
FIG. 10 is a fifth schematic flowchart of a communication method according to an embodiment of this application.

As shown in FIG. 10, before step 601, the communication method further includes steps 1001 and 1002.

Step 1001: The first terminal device sends assistance information to the network device.

Optionally, the NAS entity, the SDAP entity, the RRC entity, the PDCP entity, the RLC entity, the MAC entity, or the PHY entity of the first terminal device generates the assistance information, and the PHY entity of the first terminal device sends the assistance information to a PHY entity of the network device.

The assistance information includes traffic model information and the communication type.

The traffic model information may include one or more of the following parameters: a traffic periodicity (for example, trafficPeriodicity), a time offset (for example, timingOffset) between a data packet arrival moment and a base station system frame, an SL data packet priority (for example, priorityInfoSL), a Uu interface LCH identifier (for example, logicalChannelIdentityUL), a message packet size (for example, messageSize), a traffic identifier (for example, trafficDestination), and an SL data packet reliability identifier (for example, reliabilityInfoSL).

The first terminal device may send the assistance information to the network device, where the assistance information includes the traffic model information and the communication type. The network device may allocate a transmission resource to the first terminal device based on the assistance information. Alternatively, the network device may allocate a scheduling resource to the first terminal device based on the assistance information.

For example, if the assistance information includes the traffic identifier and the communication type, and the traffic identifier includes the second target side identifier (for example, a destination layer-2 id), the network device may allocate the transmission resource to the first terminal device based on a prestored correspondence between a second target side identifier, a communication type, and a transmission resource; or the network device may allocate the transmission resource to the first terminal device based on information about a correspondence that is between a second target side identifier, a communication type, and a transmission resource and that is received from a core network device; or the network device may allocate, based on traffic information that is reported by the first terminal device and that includes the second target side identifier, the communication type, and a frequency corresponding to the second target side identifier and the communication type, the transmission resource to the first terminal device at the frequency. In this case, the first terminal device may determine that a priority of an LCH corresponding to the second target side identifier and the communication type is the highest, and the first terminal device preferentially sends the traffic data corresponding to the second target side identifier and the communication type; or the first terminal device may send, on the transmission resource, traffic data having the same second target side identifier and communication type.

For example, if the assistance information includes the traffic periodicity and the communication type, the network device may allocate the scheduling resource to the first terminal device based on a prestored correspondence between a communication type and a transmission resource; or the network device may allocate the scheduling resource to the first terminal device based on a correspondence that is between a communication type and a transmission resource and that is received from a core network device; or the network device may allocate, based on traffic information that is reported by the first terminal device and that includes the communication type and a frequency corresponding to the communication type, the scheduling resource to the first terminal device at the frequency. The scheduling resource may be a semi-persistent scheduling resource or a dynamic scheduling resource. In this case, the first terminal device may send, on the scheduling resource in the traffic periodicity (for example, 20 milliseconds), traffic data having the same communication type.

For example, if the assistance information includes the traffic periodicity, the traffic identifier, and the communication type, and the traffic identifier includes the second target side identifier (for example, a destination layer-2 id), the network device may allocate the scheduling resource to the first terminal device based on a prestored correspondence between a second target side identifier, a communication type, and a transmission resource; or the network device may allocate the scheduling resource to the first terminal device based on information about a correspondence that is between a second target side identifier, a communication type, and a transmission resource and that is received from a core network device; or the network device may allocate, based on traffic information that is reported by the first terminal device and that includes the second target side identifier, the communication type, and a frequency corresponding to the second target side identifier and the communication type, the scheduling resource to the first terminal device at the frequency. The scheduling resource may be a semi-persistent scheduling resource or a dynamic scheduling resource. In this case, the first terminal device may send, on the scheduling resource in the traffic periodicity (for example, 50 milliseconds), traffic data having the same second target side identifier and communication type.

Optionally, the first terminal device sends the assistance information to the network device, where the assistance information includes the traffic model information and the communication type. The network device may allocate, to the first terminal device based on the assistance information, the transmission resource used to transmit data and a feedback resource used to send feedback information.

For example, if the communication type is the unicast communication, the network device may allocate, to the first terminal device based on the assistance information, the transmission resource used to transmit the data and one feedback resource used to send the feedback information; if the communication type is the multicast communication, the network device may allocate, to the first terminal device based on the assistance information, the transmission resource used to transmit the data and a plurality of feedback resources used to send the feedback information; if the communication type is the broadcast communication, the network device may allocate, to the first terminal device based on the assistance information, the transmission resource used to transmit the data, and the network device may allocate no feedback resource to the first terminal device.

Optionally, after receiving the assistance information sent by the first terminal device, the network device sends the feedback information to the first terminal device, where the feedback information is used to indicate whether the network device successfully receives the assistance information.

Step 1002: The first terminal device receives the scheduling resource from the network device.

Optionally, after the network device receives the assistance information, an RRC entity of the network device generates configuration information including the scheduling resource, and sends the configuration information to the first terminal device.

The scheduling resource may include a sidelink transmission resource used to send the traffic data. According to the method shown in FIG. 10, the first terminal device can send the assistance information to the network device, where the assistance information may include the traffic model information and the communication type, and the network device can allocate, to the first terminal device based on the traffic model information and the communication type, the scheduling resource corresponding to the communication type.

Further, before the first terminal device sends the SCI to the second terminal device, the first terminal device may further send QoS information to the network device, where the QoS information may include the second target side identifier and the communication type, or include the communication type, so that the network device sends configuration information of an SLRB to the first terminal device based on the QoS information.

Figure 11:
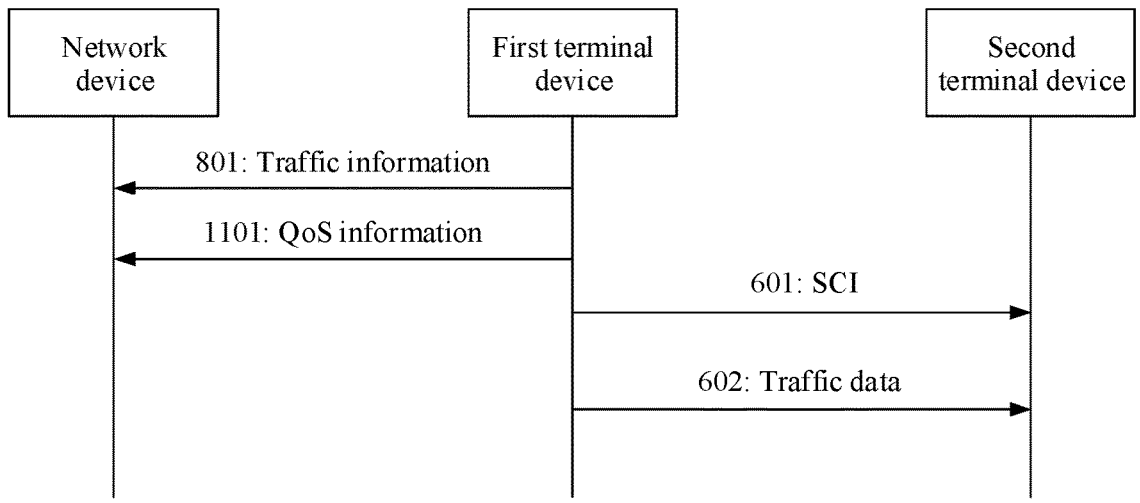
FIG. 11 is a sixth schematic flowchart of a communication method according to an embodiment of this application.

As shown in FIG. 11, before step 601, the communication method further includes step 1101.

Step 1101: The first terminal device sends QoS information to the network device.

Optionally, an upper layer entity or an AS entity of the first terminal device generates the QoS information, and the PHY entity of the first terminal device sends the QoS information to a PHY entity of the network device. The upper layer entity includes the application layer entity, the V2X layer entity, and the NAS entity.

The QoS information may include the second target side identifier and the communication type, or include the communication type.

Optionally, the QoS information further includes at least one of the following information: a connection identifier (for example, ConnId) of a unicast or multicast connection, a connection group identifier (for example, GroupId) of the multicast connection, the second source side identifier (for example, a layer 2 ID of the first terminal device), and traffic quality information. The traffic quality information may be traffic quality information such as a PPPP, PPPR, a QFI, a 5QI, a VQI, and a PQI. Specifically, the traffic quality information may include a latency, reliability, a communication distance, a rate, a packet size, a packet interval, and the like.

The first terminal device may send the QoS information to the network device, and the network device may send configuration information of an SLRB to the first terminal device based on a prestored correspondence between QoS information and configuration information of an SLRB; or the network device may send configuration information of an SLRB to the first terminal device based on a correspondence between that is QoS information and configuration information of an SLRB and that is received from a core network device.

Optionally, after receiving the QoS information sent by the first terminal device, the network device sends feedback information to the first terminal device, where the feedback information is used to indicate whether the network device successfully receives the QoS information.

According to the method shown in FIG. 11, the first terminal device can send the QoS information to the network device, where the QoS information may include the second target side identifier and the communication type, or may include the communication type, and the network device can send the configuration information of the SLRB to the first terminal device based on the QoS information.

Further, before the first terminal device sends the SCI to the second terminal device, the first terminal device may further receive, from the network device, configuration information of the SLRB, and configure, based on configuration information of the SLRB, the SLRB corresponding to the traffic data.

Figure 12:
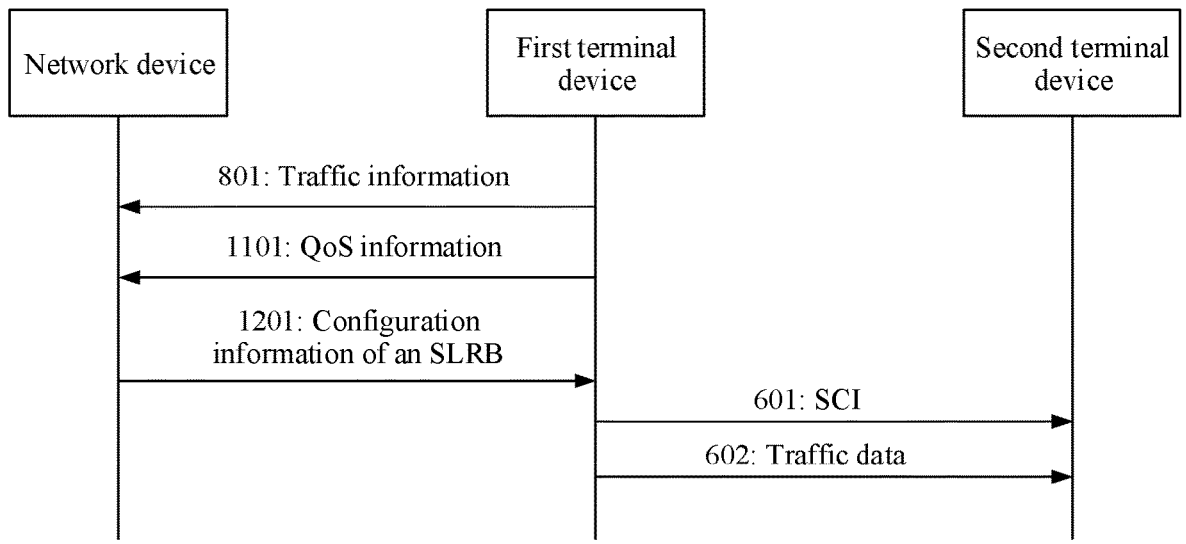
FIG. 12 is a seventh schematic flowchart of a communication method according to an embodiment of this application.

As shown in FIG. 12, before step 601, the communication method further includes step 1201.

Step 1201: The first terminal device receives configuration information of an SLRB from the network device.

Optionally, the PHY entity of the first terminal device receives the configuration information of the SLRB from the PHY entity of the network device.

The configuration information of the SLRB may be generated by the network device.

The configuration information of the SLRB may include an SLRB configuration corresponding to the second target side identifier and/or the communication type. The SLRB configuration includes at least one of a mapping relationship from a quality of service flow QoS flow to a sidelink data radio bearer SL-DRB, a PDCP configuration, an RLC configuration, and an LCH configuration.

Optionally, the first terminal device configures, based on the configuration information of the SLRB, an SLRB corresponding to the second target side identifier and the communication type; or the first terminal device configures, based on the configuration information of the SLRB, an SLRB corresponding to the communication type.

Optionally, after receiving the configuration information that is of the SLRB and that is sent by the network device, the first terminal device sends feedback information to the network device, where the feedback information is used to indicate whether the first terminal device successfully receives the configuration information of the SLRB. For example, if the feedback information is an ACK, it indicates that the first terminal device successfully receives the configuration information of the SLRB. If the feedback information is a NACK, it indicates that the first terminal device fails to receive the configuration information of the SLRB.

According to the method shown in FIG. 12, the first terminal device may receive the configuration information that is of the SLRB and that is sent by the network device, and configure, based on the configuration information of the SLRB, the SLRB corresponding to the second target side identifier and/or the communication type.

Further, before the first terminal device sends the SCI to the second terminal device, the first terminal device may further send the configuration information of the SLRB to the second terminal device, so that the second terminal device may process the received traffic data based on the configuration information of the SLRB.

Figure 13:
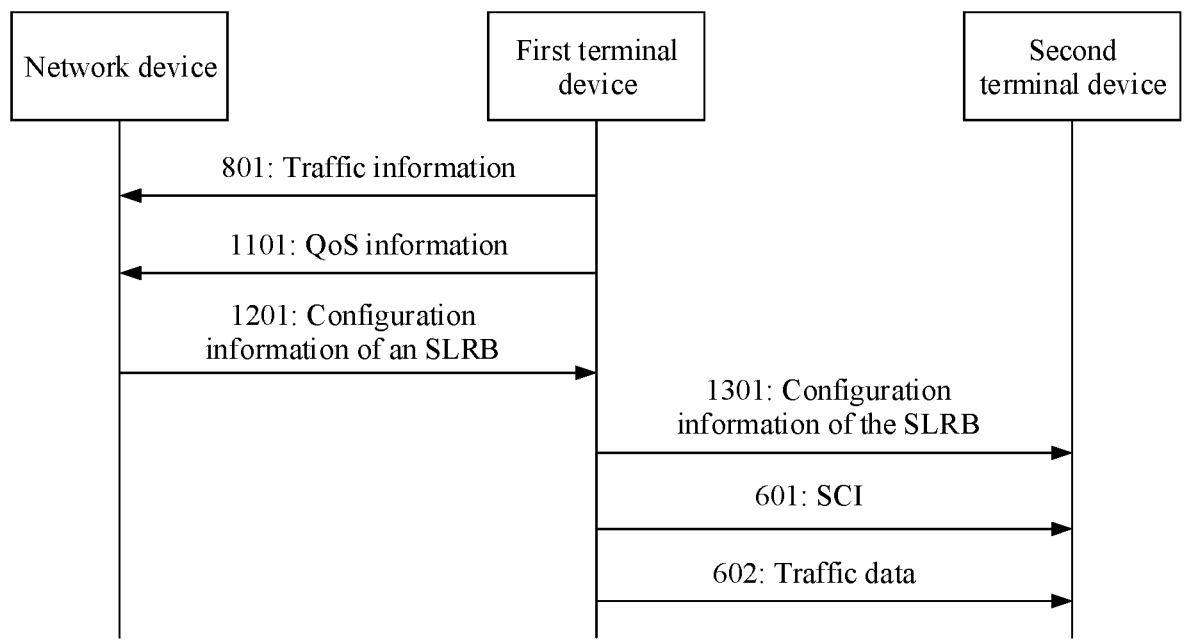
FIG. 13 is an eighth schematic flowchart of a communication method according to an embodiment of this application.

As shown in FIG. 13, before step 601, the communication method further includes step 1301.

Step 1301: The first terminal device sends configuration information of an SLRB to the second terminal device.

Optionally, the PHY entity of the first terminal device sends the configuration information of the SLRB to the PHY entity of the second terminal device.

Optionally, after receiving the configuration information that is of the SLRB and that is sent by the network device, the first terminal device sends the configuration information of the SLRB to the second terminal device.

It should be noted that the second terminal device may process the received traffic data based on the configuration information of the SLRB.

Optionally, the second terminal device receives the configuration information that is of the SLRB and that is sent by the first terminal device, and sends feedback information to the first terminal device, where the feedback information is used to indicate whether the second terminal device successfully receives the configuration information of the SLRB. For example, if the feedback information is an ACK, it indicates that the second terminal device successfully receives the configuration information of the SLRB. If the feedback information is a NACK, it indicates that the second terminal device fails to receive the configuration information of the SLRB.

According to the method shown in FIG. 13, the second terminal device may receive the configuration information that is of the SLRB and that is sent by the first terminal device, and process the received traffic data based on the configuration information of the SLRB.

Further, before the first terminal device sends the SCI to the second terminal device, the first terminal device may set up a first connection to the second terminal device, so that the second terminal device receives the traffic data.

Figure 14:
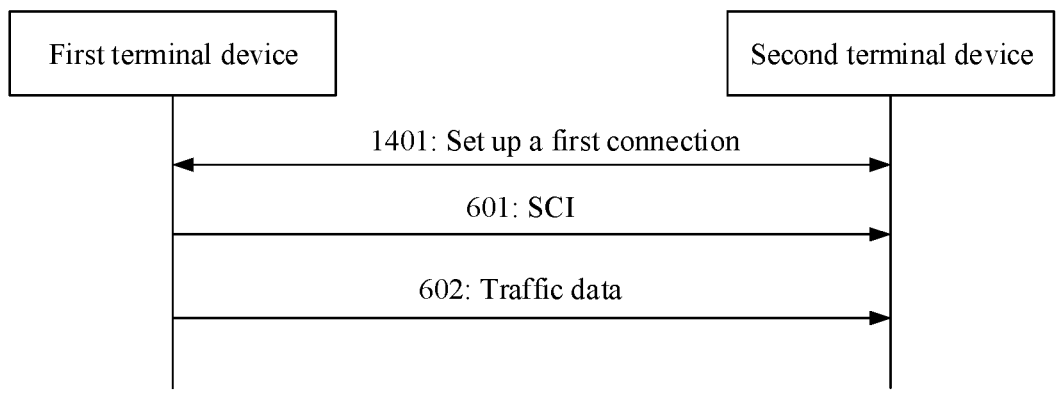
FIG. 14 is a ninth schematic flowchart of a communication method according to an embodiment of this application.

As shown in FIG. 14, before step 601, the communication method further includes step 1401.

Step 1401: The first terminal device sets up a first connection to the second terminal device.

Optionally, before the first terminal device sends the SCI, if the first terminal device does not set up, to the second terminal device, the first connection corresponding to the second target side identifier and/or the communication type, the first terminal device sets up the first connection to the second terminal device.

Optionally, before the first terminal device sends the SCI, if the first terminal device does not set up, to the second terminal device, the first connection corresponding to the second source side identifier, the second target side identifier, and the communication type, the first terminal device sets up the first connection to the second terminal device.

Optionally, before the second terminal device receives the traffic data, if the second terminal device does not set up, to the first terminal device, the first connection corresponding to the second target side identifier and/or the communication type, the second terminal device sets up the first connection to the first terminal device.

Optionally, before the second terminal device receives the traffic data, if the second terminal device does not set up, to the first terminal device, the first connection corresponding to the second source side identifier, the second target side identifier, and the communication type, the second terminal device sets up the first connection to the first terminal device.

Optionally, when the second terminal device receives the traffic data, if the second terminal device does not set up, to the first terminal device, the first connection corresponding to the second target side identifier and/or the communication type, the second terminal device sets up the first connection to the first terminal device.

Optionally, when the second terminal device receives the traffic data, if the second terminal device does not set up, to the first terminal device, the first connection corresponding to the second source side identifier, the second target side identifier, and the communication type, the second terminal device sets up the first connection to the first terminal device.

Optionally, after the second terminal device receives the traffic data, if the second terminal device does not set up, to the first terminal device, the first connection corresponding to the second target side identifier and/or the communication type, the second terminal device sets up the first connection to the first terminal device.

Optionally, after the second terminal device receives the traffic data, if the second terminal device does not set up, to the first terminal device, the first connection corresponding to the second source side identifier, the second target side identifier, and the communication type, the second terminal device sets up the first connection to the first terminal device.

Optionally, the first connection is an AS connection and/or an SLRB connection.

According to the method shown in FIG. 14, after setting up the first connection to the second terminal device, the first terminal device sends the SCI and the traffic data corresponding to the SCI to the second terminal device, where the SCI includes the first target side identifier and the communication type, or the SCI includes the communication type. The second terminal device may receive the traffic data of the corresponding communication type, to reduce a packet receiving error rate of the second terminal device, and further improve packet receiving efficiency of the second terminal device.

The foregoing mainly describes the solutions provided in the embodiments of this application from a perspective of interaction between the network elements. It may be understood that, to implement the foregoing function, the first terminal device, the second terminal device, or the network device includes a corresponding hardware structure and/or a software module for performing the function. A person skilled in the art should easily be aware that, in combination with the units and algorithm operations in the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first terminal device, the second terminal device, or the network device may be divided into function modules based on the foregoing method examples. For example, the function modules may be obtained through division based on corresponding functions, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, there may be another division manner.

Figure 15:
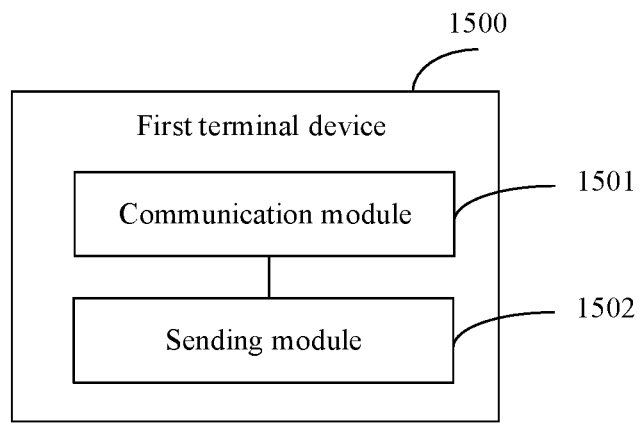
FIG. 15 is a first schematic structural diagram of a first terminal device according to an embodiment of this application.

For example, when the function modules are obtained through division in an integration manner, FIG. 15 is a schematic structural diagram of a first terminal device 1500. The first terminal device 1500 includes a communication module 1501 and a sending module 1502. The communication module 1501 is configured to communicate with a network device and a second terminal. The sending module 1502 is configured to send sidelink control information SCI and traffic data to the second terminal device, where the SCI includes a first target side identifier and a communication type, or includes the communication type.

Figure 16:
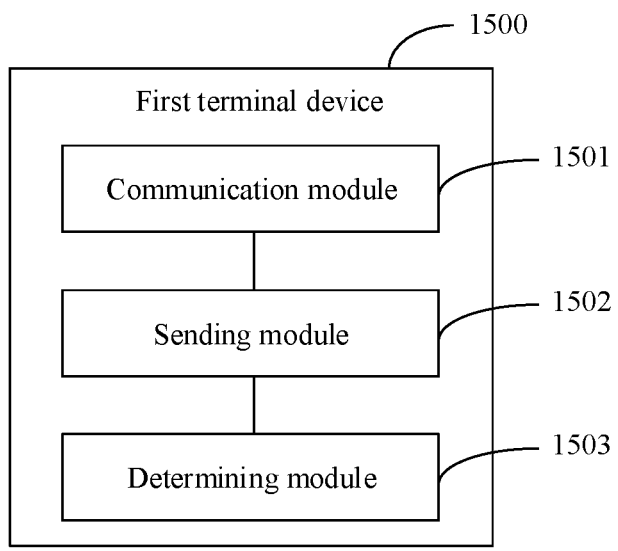
FIG. 16 is a second schematic structural diagram of a first terminal device according to an embodiment of this application.

Optionally, as shown in FIG. 16, the first terminal device 1500 further includes a determining module 1503. The determining module 1503 is configured to determine the traffic data based on a second target side identifier and the communication type, where the second target side identifier is used to identify the traffic data, and the second target side identifier corresponds to the first target side identifier.

Figure 17:
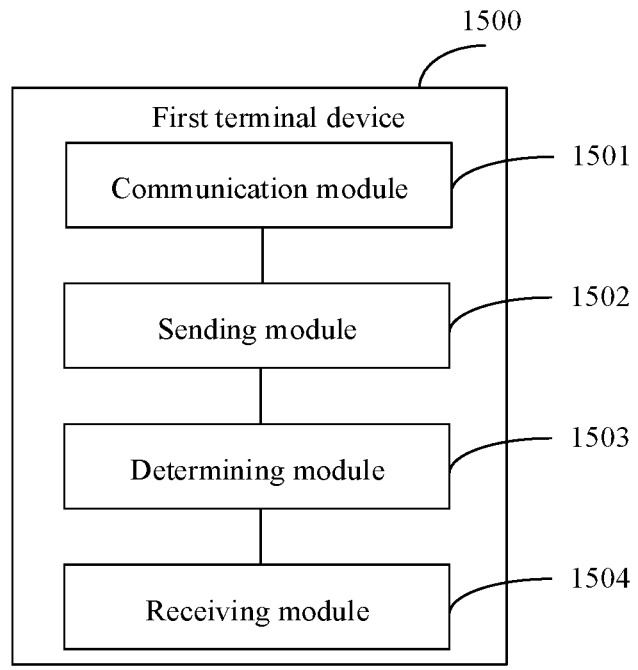
FIG. 17 is a third schematic structural diagram of a first terminal device according to an embodiment of this application.

Optionally, as shown in FIG. 17, the first terminal device 1500 further includes a receiving module 1504. The receiving module 1504 is configured to receive first configuration information from the network device, where the first configuration information includes the second target side identifier, the communication type, and second configuration information corresponding to the second target side identifier and the communication type, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type and second configuration information corresponding to the communication type, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the second target side identifier, the communication type, second configuration information corresponding to the second target side identifier and the communication type, QoS information, and configuration information of a sidelink radio bearer SLRB corresponding to the QoS information, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type, second configuration information corresponding to the communication type, QoS information, and configuration information of a sidelink radio bearer SLRB corresponding to the QoS information, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes QoS information and configuration information of a sidelink radio bearer SLRB corresponding to the QoS information.

Optionally, the first configuration information is a system information block SIB, radio resource control RRC signaling, media access control MAC signaling, downlink control information DCI, non-access stratum NAS signaling, or a V3 interface message.

Figure 18:
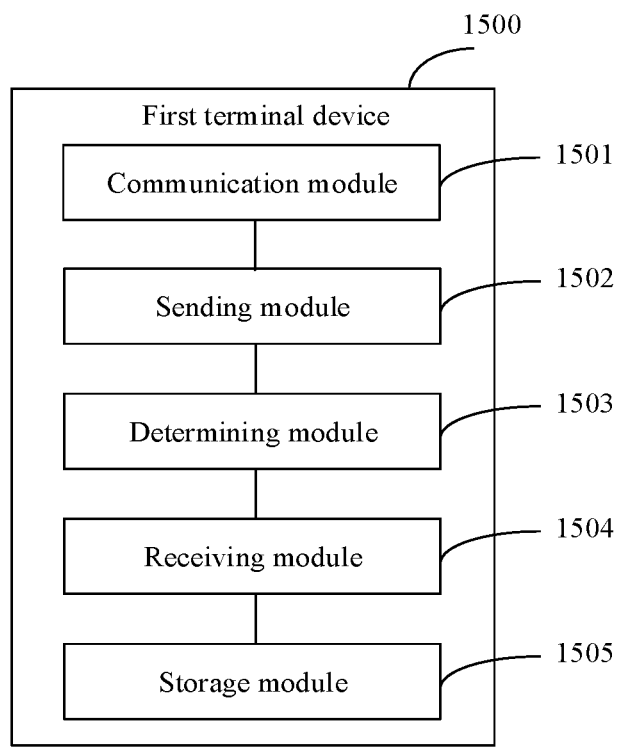
FIG. 18 is a fourth schematic structural diagram of a first terminal device according to an embodiment of this application.

Optionally, as shown in FIG. 18, the first terminal device 1500 further includes a storage module 1505. The storage module 1505 is configured to store first configuration information, where the first configuration information includes the second target side identifier, the communication type, and second configuration information corresponding to the second target side identifier and the communication type, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type and second configuration information corresponding to the communication type, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the second target side identifier, the communication type, second configuration information corresponding to the second target side identifier and the communication type, QoS information, and configuration information of a sidelink radio bearer SLRB corresponding to the QoS information, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type, second configuration information corresponding to the communication type, QoS information, and configuration information of a sidelink radio bearer SLRB corresponding to the QoS information, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes QoS information and configuration information of a sidelink radio bearer SLRB corresponding to the QoS information.

Optionally, the sending module 1502 is further configured to send traffic information to the network device, where the traffic information includes the communication type.

Optionally, the sending module 1502 is further configured to send a buffer status report BSR to the network device, where the BSR includes the second target side identifier and the communication type, or includes the communication type.

Optionally, the sending module 1502 is further configured to send assistance information to the network device, where the assistance information includes traffic model information and the communication type.

Optionally, the sending module 1502 is further configured to send QoS information to the network device, where the QoS information includes the second target side identifier and the communication type, or includes the communication type.

Optionally, the receiving module 1504 is further configured to receive the configuration information of the SLRB from the network device, where the configuration information of the SLRB includes an SLRB configuration corresponding to the second target side identifier and/or the communication type, and the SLRB configuration includes at least one of a mapping relationship from a quality of service flow QoS flow to a sidelink data radio bearer SL-DRB, a packet data convergence protocol PDCP configuration, a radio link control RLC configuration, and a logical channel LCH configuration.

Optionally, the sending module 1502 is further configured to send the configuration information of the SLRB to the second terminal device.

Figure 19:
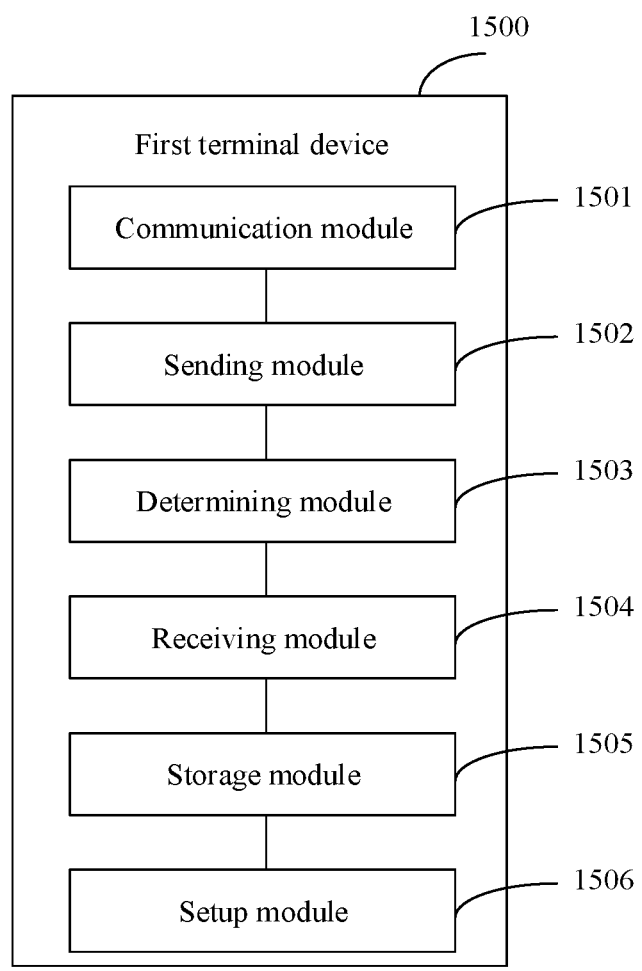
FIG. 19 is a fifth schematic structural diagram of a first terminal device according to an embodiment of this application.

Optionally, as shown in FIG. 19, the first terminal device 1500 further includes a setup module 1506. The setup module 1506 is configured to: if the first terminal device does not set up, to the second terminal device, a first connection corresponding to the second target side identifier and/or the communication type, the first terminal device sets up the first connection, where the first connection is an access stratum AS connection and/or a sidelink radio bearer SLRB connection.

All related content of the operations in the foregoing method embodiments may be cited in function descriptions of a corresponding function module, and details are not described herein again.

In this embodiment, the first terminal device 1500 is presented in a form of the function modules obtained through division in the integration manner. The "module" herein may be a specific ASIC, a circuit, a processor, and a memory that execute one or more software or firmware programs, an integrated logic circuit, and/or another component that can provide the foregoing functions. In a simple embodiment, a person skilled in the art may figure out that the first terminal device 1500 may be in the form shown in FIG. 5.

For example, the processor 501 in FIG. 5 may invoke the computer-executable instructions stored in the memory 504, to enable the first terminal device 1500 to perform the communication method in the foregoing method embodiment.

For example, functions/implementation processes of the communication module 1501, the sending module 1502, the determining module 1503, the receiving module 1504, the storage module 1505, and the setup module 1506 in FIG. 19 may be implemented by the processor 501 in FIG. 5 by invoking the computer-executable instructions stored in the memory 504. Alternatively, functions/implementation processes of the communication module 1501, the determining module 1503, the storage module 1505, and the setup module 1506 in FIG. 19 may be implemented by the processor 501 in FIG. 5 by invoking the computer-executable instructions stored in the memory 504, and functions/implementation processes of the sending module 1502 and the receiving module 1504 in FIG. 19 may be implemented by using the communication interface 503 in FIG. 5.

The first terminal device 1500 provided in this embodiment can perform the foregoing communication method. Therefore, for a technical effect that can be achieved by the first terminal device 1500, refer to the foregoing method embodiment. Details are not described herein again.

Figure 20:
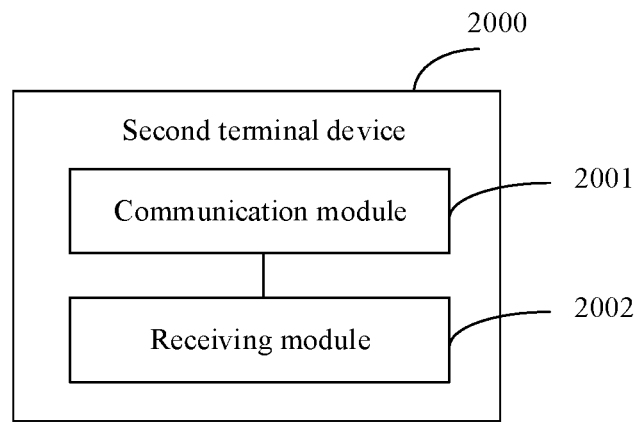
FIG. 20 is a first schematic structural diagram of a second terminal device according to an embodiment of this application.

Alternatively, for example, when the function modules are obtained through division in an integration manner, FIG. 20 is a schematic structural diagram of a second terminal device 2000. The second terminal device 2000 includes a communication module 2001 and a receiving module 2002. The communication module 2001 is configured to communicate with a network device and a first terminal device. The receiving module 2002 is configured to receive sidelink control information SCI and traffic data that are sent by the first terminal device, where the SCI includes a first target side identifier and a communication type, or includes the communication type.

Figure 21:
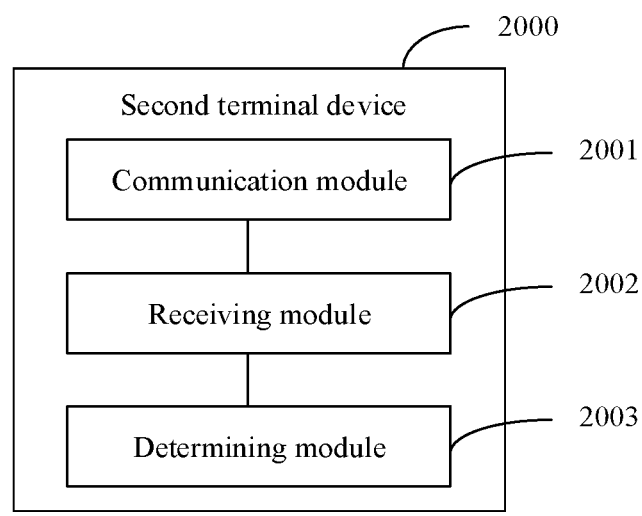
FIG. 21 is a second schematic structural diagram of a second terminal device according to an embodiment of this application.

Optionally, as shown in FIG. 21, the second terminal device 2000 further includes a determining module 2003. The determining module 2003 is configured to determine, based on the communication type included in the SCI and a capability of the second terminal device for supporting the communication type, to receive the traffic data; or the determining module 2003 is configured to determine, based on the first target side identifier and the communication type that are included in the SCI, and a capability of the second terminal device for supporting the first target side identifier and the communication type, to receive the traffic data.

Optionally, the receiving module 2002 is further configured to receive first configuration information from the network device, where the first configuration information includes a second target side identifier, the communication type, and second configuration information corresponding to the second target side identifier and the communication type, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type and second configuration information corresponding to the communication type, where a second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes a second target side identifier and the communication type, second configuration information corresponding to the second target side identifier and the communication type, QoS information, and configuration information of a sidelink radio bearer SLRB corresponding to the QoS information, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes the communication type, second configuration information corresponding to the communication type, QoS information, and configuration information of a sidelink radio bearer SLRB corresponding to the QoS information, where a second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes QoS information and configuration information of a sidelink radio bearer SLRB corresponding to the QoS information.

Optionally, the first configuration information is a system information block SIB, radio resource control RRC signaling, MAC signaling, downlink control information DCI, non-access stratum NAS signaling, or a V3 interface message.

Optionally, the receiving module 2002 is further configured to receive the configuration information of the sidelink radio bearer SLRB from the first terminal device, where the configuration information of the SLRB includes an SLRB configuration corresponding to the second target side identifier and/or the communication type, and the SLRB configuration includes at least one of a mapping relationship from a quality of service flow QoS flow to a sidelink data radio bearer SL-DRB, a packet data convergence protocol PDCP configuration, a radio link control RLC configuration, and a logical channel LCH configuration.

Figure 22:
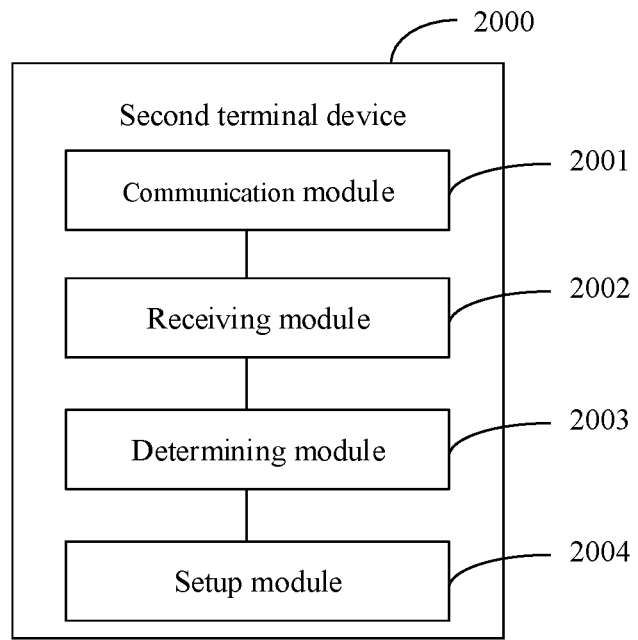
FIG. 22 is a third schematic structural diagram of a second terminal device according to an embodiment of this application.

Optionally, as shown in FIG. 22, the second terminal device 2000 further includes a setup module 2004. The setup module 2004 is configured to: if the second terminal device does not set up, to the first terminal device, a first connection corresponding to the second target side identifier and/or the communication type, set up the first connection, where the first connection is an access stratum AS connection and/or a sidelink radio bearer SLRB connection.

All related content of the operations in the foregoing method embodiments may be cited in function descriptions of a corresponding function module, and details are not described herein again.

In this embodiment, the second terminal device 2000 is presented in a form of the function modules obtained through division in the integration manner. The "module" herein may be a specific ASIC, a circuit, a processor, and a memory that execute one or more software or firmware programs, an integrated logic circuit, and/or another component that can provide the foregoing functions. In a simple embodiment, a person skilled in the art may figure out that the second terminal device 2000 may be in the form shown in FIG. 5.

For example, the processor 501 in FIG. 5 may invoke the computer-executable instructions stored in the memory 504, to enable the second terminal device 2000 to perform the communication method in the foregoing method embodiment.

For example, functions/implementation processes of the communication module 2001, the receiving module 2002, the determining module 2003, and the setup module 2004 in FIG. 22 may be implemented by the processor 501 in FIG. 5 by invoking the computer-executable instructions stored in the memory 504. Alternatively, functions/implementation processes of the determining module 2003 and the setup module 2004 in FIG. 22 may be implemented by the processor 501 in FIG. 5 by invoking the computer-executable instructions stored in the memory 504, and functions/implementation processes of the communication module 2001 and the receiving module 2002 in FIG. 22 may be implemented by using the communication interface 503 in FIG. 5.

The second terminal device 2000 provided in this embodiment can perform the foregoing communication method. Therefore, for a technical effect that can be achieved by the second terminal device 2000, refer to the foregoing method embodiment. Details are not described herein again.

Figure 23:
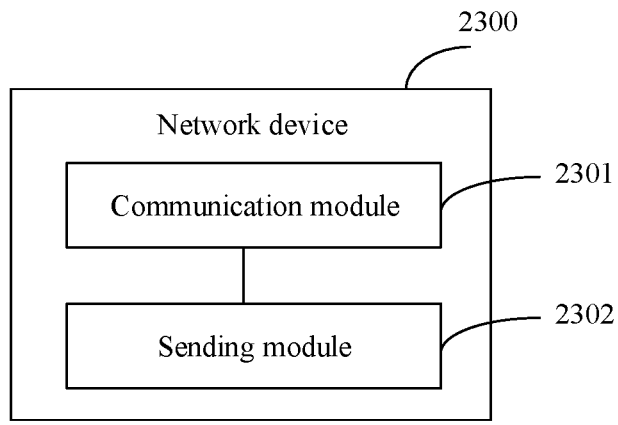
FIG. 23 is a first schematic structural diagram of a network device according to an embodiment of this application.

Alternatively, for example, when the function modules are obtained through division in an integration manner, FIG. 23 is a schematic structural diagram of a network device 2300. The network device 2300 includes a communication module 2301 and a sending module 2302. The communication module 2301 is configured to communicate with a first terminal device and a second terminal device. The sending module 2302 is configured to send first configuration information to the first terminal device and/or the second terminal device, where the first configuration information includes a second target side identifier, a communication type, and second configuration information corresponding to the second target side identifier and the communication type, where the second target side identifier is used to identify traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes a communication type and second configuration information corresponding to the communication type, where the second target side identifier is used to identify traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes a second target side identifier, a communication type, second configuration information corresponding to the second target side identifier and the communication type, QoS information, and configuration information of a sidelink radio bearer SLRB corresponding to the QoS information, where the second target side identifier is used to identify traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes a communication type, second configuration information corresponding to the communication type, QoS information, and configuration information of a sidelink radio bearer SLRB corresponding to the QoS information, where the second target side identifier is used to identify the traffic data, the second configuration information includes sidelink configuration information and/or a scheduling resource, the sidelink configuration information is used to indicate a synchronization configuration, a sending manner, or a position of a transmission resource, and the scheduling resource includes a transmission resource corresponding to the second target side identifier and/or the communication type; or the first configuration information includes QoS information and configuration information of a sidelink radio bearer SLRB corresponding to the QoS information.

Optionally, the first configuration information is a system information block SIB, radio resource control RRC signaling, media access control MAC signaling, downlink control information DCI, non-access stratum NAS signaling, or a V3 interface message.

Figure 24:
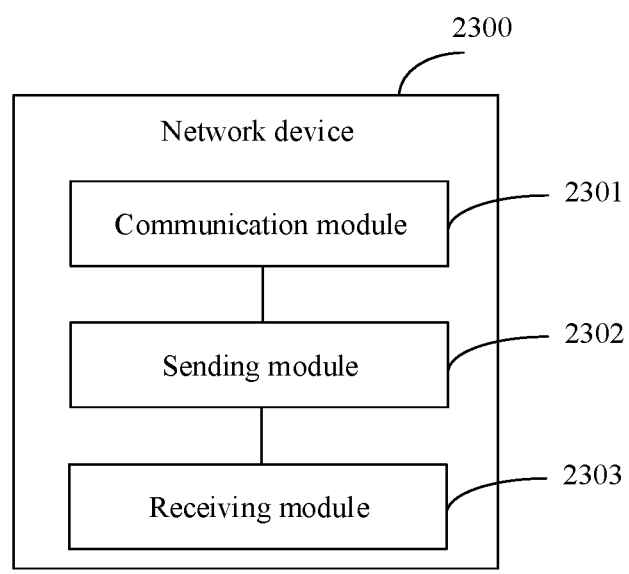
FIG. 24 is a second schematic structural diagram of a network device according to an embodiment of this application.

Optionally, as shown in FIG. 24, the network device further includes a receiving module 2303. The receiving module 2303 is configured to receive traffic information from the first terminal device, where the traffic information includes the communication type.

Optionally, the receiving module 2303 is further configured to receive a buffer status report BSR from the first terminal device, where the BSR includes the second target side identifier and the communication type, or includes the communication type.

Optionally, the receiving module 2303 is further configured to receive assistance information from the first terminal device, where the assistance information includes a traffic model and the communication type.

Optionally, the receiving module 2303 is further configured to receive the QoS information from the first terminal device, where the QoS information includes the second target side identifier and the communication type, or includes the communication type.

Optionally, the sending module 2302 is further configured to send the configuration information of the sidelink radio bearer SLRB to the first terminal device based on the QoS information, where the configuration information of the SLRB includes an SLRB configuration corresponding to the second target side identifier and/or the communication type, and the SLRB configuration includes at least one of a mapping relationship from a quality of service flow QoS flow to a sidelink data radio bearer SL-DRB, a packet data convergence protocol PDCP configuration, a radio link control RLC configuration, and a logical channel LCH configuration.

All related content of the operations in the foregoing method embodiments may be cited in function descriptions of a corresponding function module, and details are not described herein again.

In this embodiment, the network device 2300 is presented in a form of the function modules obtained through division in the integration manner. The "module" herein may be a specific ASIC, a circuit, a processor, and a memory that execute one or more software or firmware programs, an integrated logic circuit, and/or another component that can provide the foregoing functions. In a simple embodiment, a person skilled in the art may figure out that the network device 2300 may be in the form shown in FIG. 5.

For example, the processor 501 in FIG. 5 may invoke the computer-executable instructions stored in the memory 504, to enable the network device 2300 to perform the communication method in the foregoing method embodiment.

For example, functions/implementation processes of the communication module 2301, the sending module 2302, and the receiving module 2303 in FIG. 24 may be implemented by the processor 501 in FIG. 5 by invoking the computer-executable instructions stored in the memory 504. Alternatively, a function/an implementation process of the communication module 2301 in FIG. 24 may be implemented by the processor 501 in FIG. 5 by invoking the computer-executable instructions stored in the memory 504, and functions/implementation processes of the sending module 2302 and the receiving module 2303 in FIG. 24 may be implemented by using the communication interface 503 in FIG. 5.

The network device 2300 provided in this embodiment can perform the foregoing communication method. Therefore, for a technical effect that can be achieved by the network device 2300, refer to the foregoing method embodiment. Details are not described herein again.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general purpose computer, a special purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, "comprising" does not exclude another component or another operation, and "a" or "one" does not exclude a case of "a plurality of". A single processor or another unit may implement several functions enumerated in the claims. Some measures are set forth in dependent claims that are different from each other, but this does not mean that these measures cannot be combined to produce a great effect.

Although this application is described with reference to specific features and the embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the spirit and scope of this application. In this way, this application is intended to cover these modifications and variations of this application provided that they fall within the scope of the claims of this application and equivalent technologies thereof.

What is claimed is:

1. A communication method, comprising:
   selecting, by a media access control (MAC) entity of a first terminal device, a target side identifier corresponding to a communication type, wherein the communication type comprises unicast communication, multicast communication, or broadcast communication, and wherein the target side identifier comprises a destination layer 2 identifier or a destination layer 1 identifier;
   obtaining, by the MAC entity of the first terminal device, a first sidelink logical channel (LCH), wherein the first sidelink LCH is an LCH having a relatively highest priority among LCHs that correspond to the target side identifier and the communication type and that have data;
   allocating, by the MAC entity of the first terminal device, a transmission resource to data on the first sidelink LCH; and
   encapsulating, by the MAC entity of the first terminal device, LCHs whose target side identifiers and communication types are the same into one transport block (TB) for sending.

2. The method according to claim 1, wherein, if there is a remaining transmission resource after the MAC entity of the first terminal device allocates the transmission resource to the first sidelink LCH, the method further comprises:
   sorting, by the first terminal device, the LCHs whose target side identifiers and communication types are the same in descending order of logical channel priorities; and
   allocating the remaining transmission resource to a data packet on a remaining LCH in the LCHs according to the descending order.

3. The method according to claim 1, wherein the selecting, by a MAC entity of a first terminal device, a target side identifier corresponding to a communication type comprises:
   determining, by the MAC entity of the first terminal device, a communication type and a target side identifier corresponding to an LCH that has data and that has a relatively highest priority; and
   using, by the MAC entity of the first terminal device, the determined target side identifier as the target side identifier corresponding to the communication type.

4. The method according to claim 1, wherein the method further comprises:
   sending, by the first terminal device, assistance information to a network device, wherein the assistance information indicates traffic model information and the communication type; and
   receiving, by the first terminal device, a scheduling resource from the network device, wherein the scheduling resource comprises a transmission resource of a sidelink used to send traffic data.

5. The method according to claim 1, wherein the method further comprises:
   sending, by the first terminal device, sidelink control information and traffic data to a second terminal device, wherein the sidelink control information comprises (1) a first target side identifier and the communication type or (2) the communication type, and wherein the traffic data comprises the data on the first sidelink LCH.

6. The method according to claim 5, wherein the method further comprises:
   determining, by the first terminal device, the traffic data based on a second target side identifier and the communication type, where the second target side identifier is used to identify the traffic data.

7. The method according to claim 1, wherein the method further comprises:
   sending, by the first terminal device, traffic information to a network device, wherein the traffic information indicates the communication type.

8. A communication apparatus, comprising:
   at least one processor, and
   one or more memories coupled to the at least one processor and storing programming instructions for execution by the at least one processor to perform operations comprising:
   selecting a target side identifier corresponding to a communication type, wherein the communication type comprises unicast communication, multicast communication, or broadcast communication, and wherein the target side identifier comprises a destination layer 2 identifier or a destination layer 1 identifier;
   obtaining a first sidelink logical channel (LCH), wherein the first sidelink LCH is an LCH having a relatively highest priority among LCHs that correspond to the target side identifier and the communication type and that have data;
   allocating a transmission resource to data on the first sidelink LCH; and
   encapsulating LCHs whose target side identifiers and communication types are the same into one transport block TB for sending.

9. The communication apparatus according to claim 8, wherein, if there is a remaining transmission resource after the transmission resource is allocated to the first sidelink LCH, the operations further comprises:
   sorting the LCHs whose target side identifiers and communication types are the same in descending order of logical channel priorities, and
   allocating the remaining transmission resource to a data packet on a remaining LCH in the LCHs according to the descending order.

10. The communication apparatus according to claim 8, wherein the operations further comprises:

determining a communication type and a target side identifier corresponding to an LCH that has data and that has a relatively highest priority; and using the determined target side identifier as the target side identifier corresponding to the communication type.

11. The communication apparatus according to claim 8, wherein the operations further comprises:

sending assistance information to a network device, wherein the assistance information indicates traffic model information and the communication type; and receiving a scheduling resource from the network device, wherein the scheduling resource comprises a transmission resource of a sidelink used to send traffic data.

12. The communication apparatus according to claim 8, wherein the operations further comprises:

sending sidelink control information and traffic data to a second terminal device, wherein the sidelink control information comprises (1) a first target side identifier and the communication type or (2) the communication type, and wherein the traffic data comprises the data on the first sidelink LCH.

13. The communication apparatus according to claim 8, wherein the operations further comprise:

sending traffic information to a network device, wherein the traffic information indicates the communication type.

14. The communication apparatus according to claim 12, wherein the operations further comprise:

determining the traffic data based on a second target side identifier and the communication type, where the second target side identifier is used to identify the traffic data.

15. A non-transitory computer-readable storage medium having stored computer programs, the computer programs being executable by one or more processors, and when executed, cause the one or more processors to:

select a target side identifier corresponding to a communication type, wherein the communication type comprises unicast communication, multicast communication, or broadcast communication, and wherein the target side identifier comprises a destination layer 2 identifier or a destination layer 1 identifier;

obtain a first sidelink logical channel (LCH), wherein the first sidelink LCH is an LCH having a relatively highest priority among LCHs that correspond to the target side identifier and the communication type and that have data;

allocate a transmission resource to data on the first sidelink LCH; and encapsulate LCHs whose target side identifiers and communication types are the same into one transport block TB for sending.

16. The non-transitory computer-readable storage medium according to claim 15, the computer programs being executable by the one or more processors, and, if there is a remaining transmission resource after the transmission resource is allocated to the first sidelink LCH, the computer programs, when executed, further cause the one or more processors to:

sort the LCHs whose target side identifiers and communication types are the same in descending order of logical channel priorities; and allocate the remaining transmission resource to a data packet on a remaining LCH in the LCHs according to the descending order.

17. The non-transitory computer-readable storage medium according to claim 15, the computer programs being executable by the one or more processors, and when executed, further cause the one or more processors to:

determine a communication type and a target side identifier corresponding to an LCH that has data and that has a relatively highest priority; and use the determined target side identifier as the target side identifier corresponding to the communication type.

18. The non-transitory computer-readable storage medium according to claim 15, the computer programs being executable by the one or more processors, and when executed, further cause the one or more processors to:

send assistance information to a network device, wherein the assistance information indicates traffic model information and the communication type; and receive a scheduling resource from the network device, wherein the scheduling resource comprises a transmission resource of a sidelink used to send traffic data.

19. The non-transitory computer-readable storage medium according to claim 15, the computer programs being executable by the one or more processors, and when executed, further cause the one or more processors to:

send sidelink control information and traffic data to a second terminal device, wherein the sidelink control information comprises (1) a first target side identifier and the communication type or (2) the communication type, and wherein the traffic data comprises the data on the first sidelink LCH.

20. The non-transitory computer-readable storage medium according to claim 15, the computer programs being executable by the one or more processors, and when executed, further cause the one or more processors to:

sending traffic information to a network device, wherein the traffic information indicates the communication type.

* * * * *